Sept. 10, 1946. W. J. MILLER 2,407,321
APPARATUS FOR PRODUCING POTTERY WARE
Filed Jan. 8, 1943 16 Sheets-Sheet 1

INVENTOR.
WILLIAM J. MILLER
BY
George J. Creninger
ATTORNEY.

Sept. 10, 1946.    W. J. MILLER    2,407,321
APPARATUS FOR PRODUCING POTTERY WARE
Filed Jan. 8, 1943    16 Sheets-Sheet 2

INVENTOR.
WILLIAM J. MILLER
BY George J. Croninger
ATTORNEY.

Sept. 10, 1946. W. J. MILLER 2,407,321
APPARATUS FOR PRODUCING POTTERY WARE
Filed Jan. 8, 1943 16 Sheets-Sheet 3
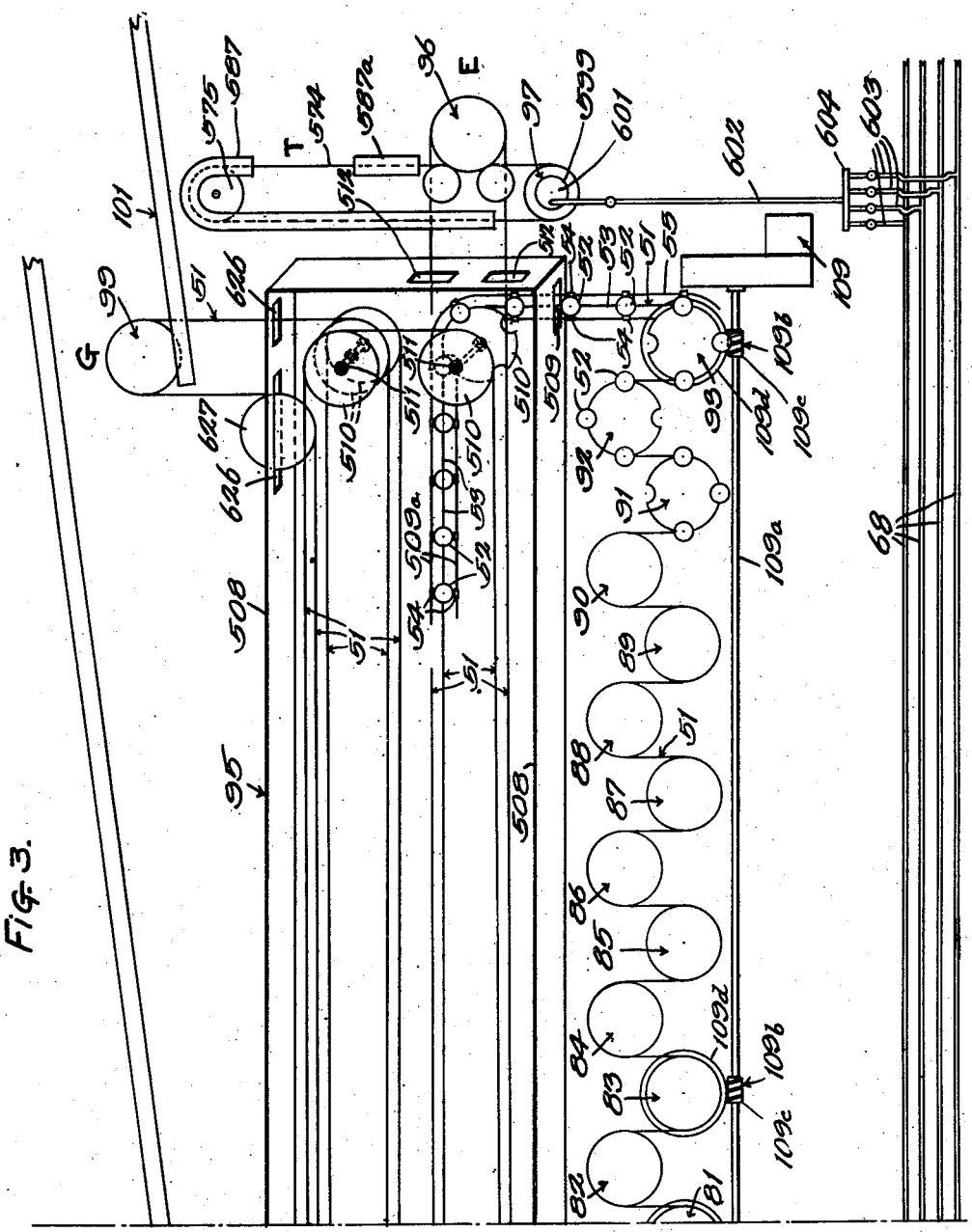
INVENTOR.
WILLIAM J. MILLER
BY
George J. Grainger
ATTORNEY.

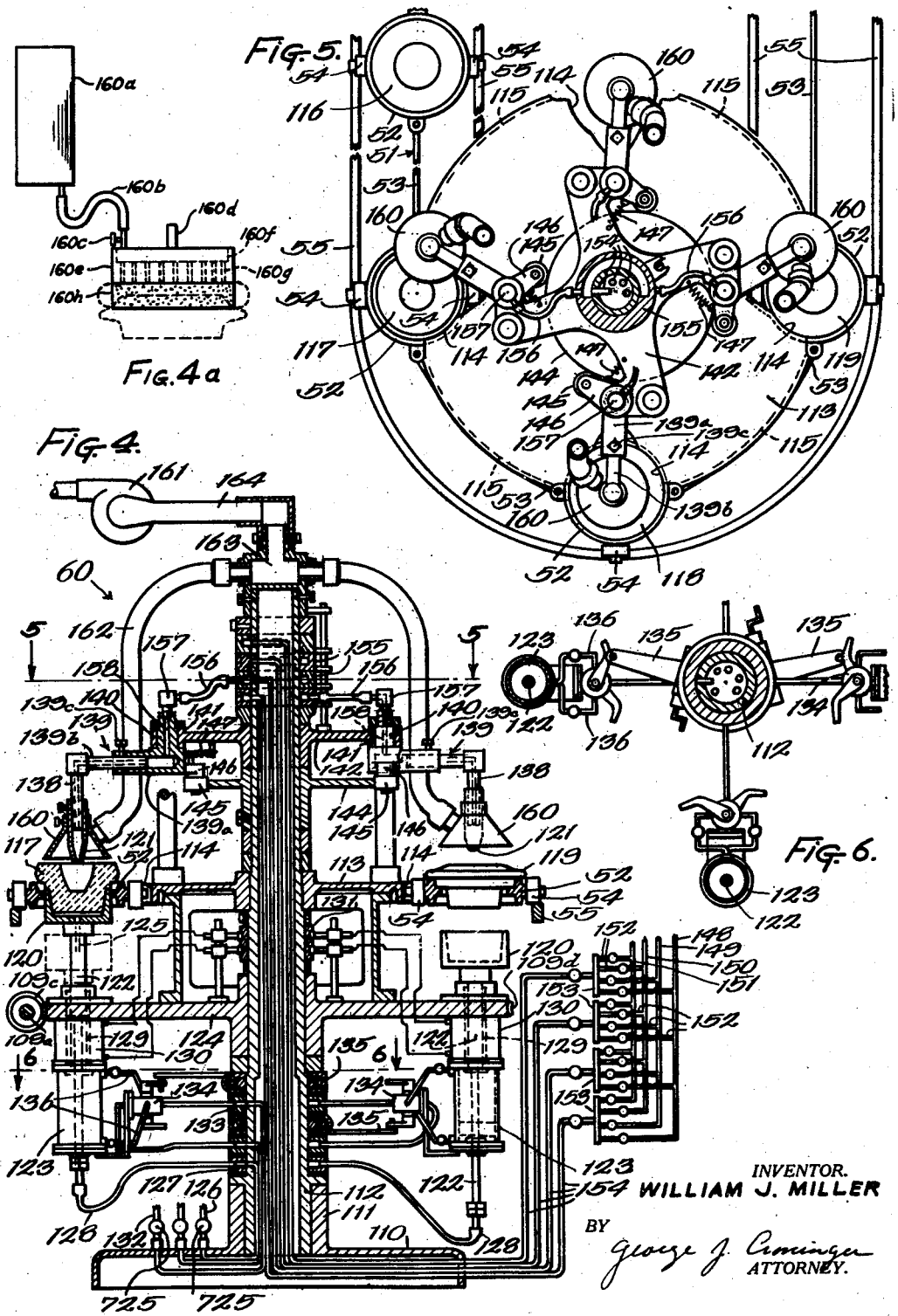

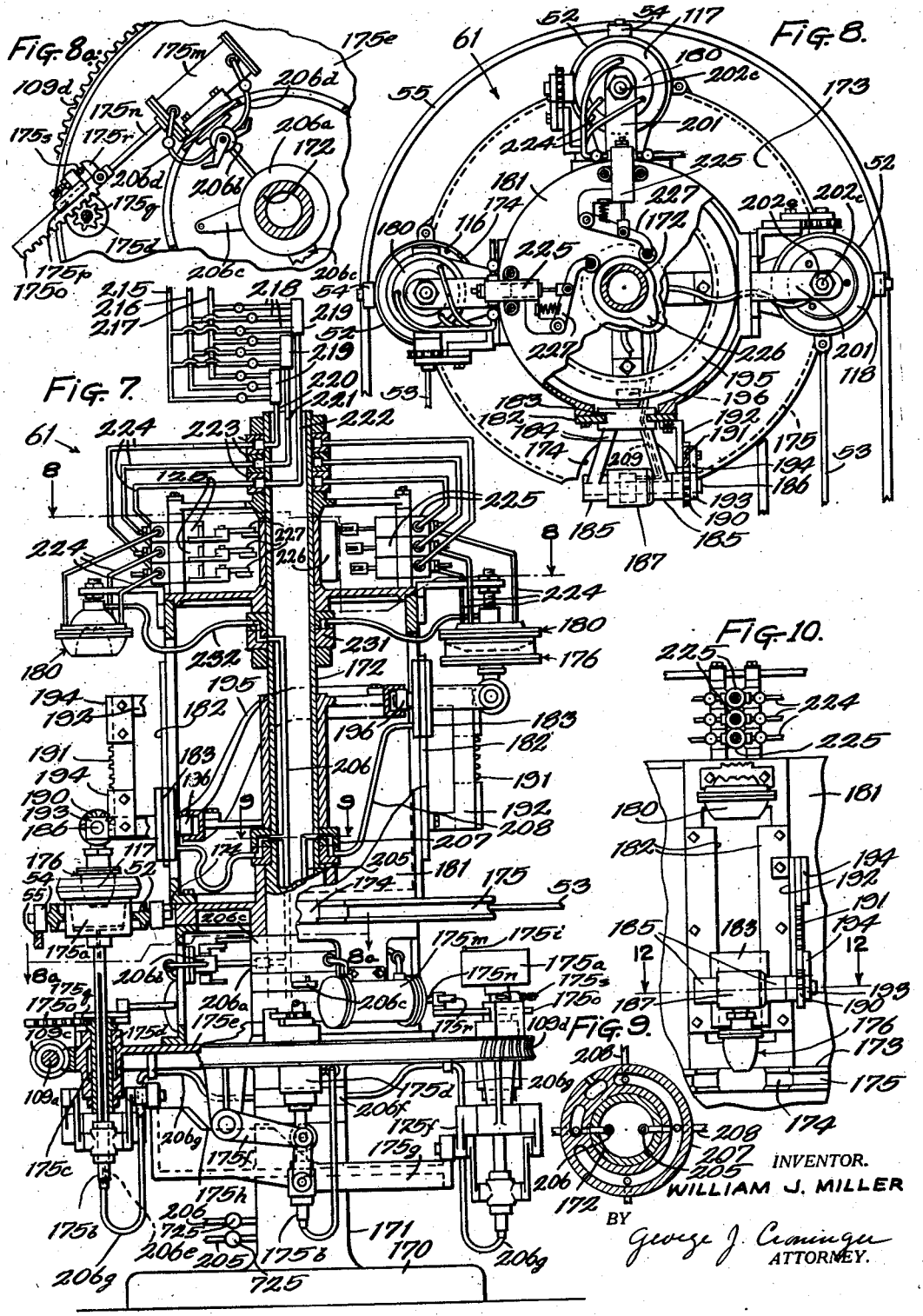

Sept. 10, 1946. W. J. MILLER 2,407,321
APPARATUS FOR PRODUCING POTTERY WARE
Filed Jan. 8, 1943 16 Sheets-Sheet 6
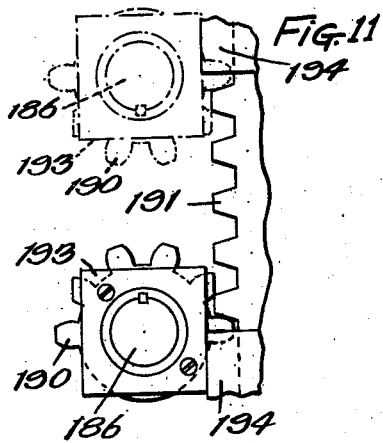
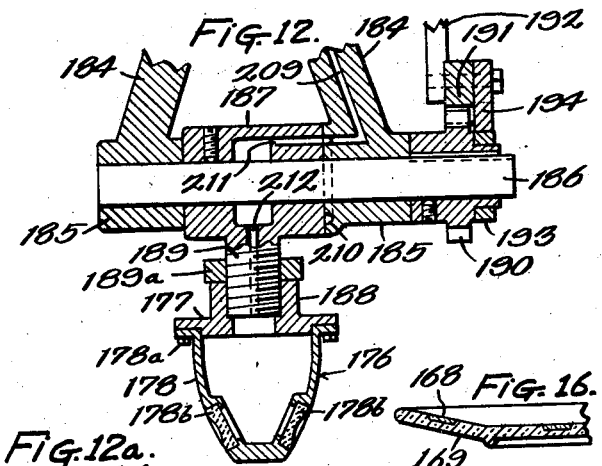
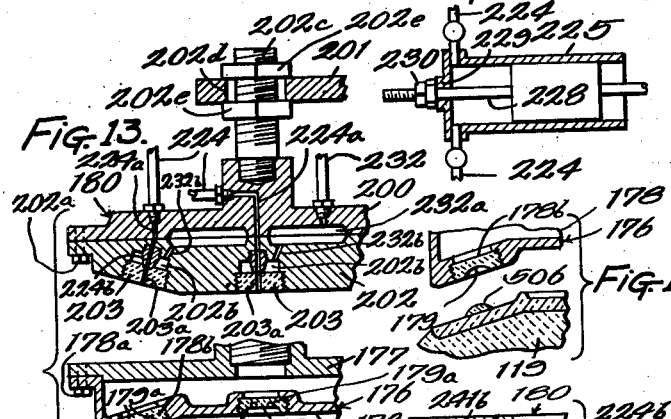
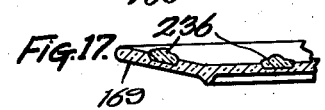
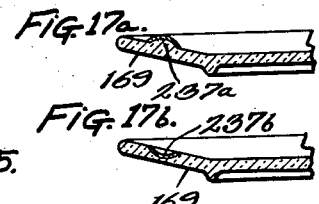
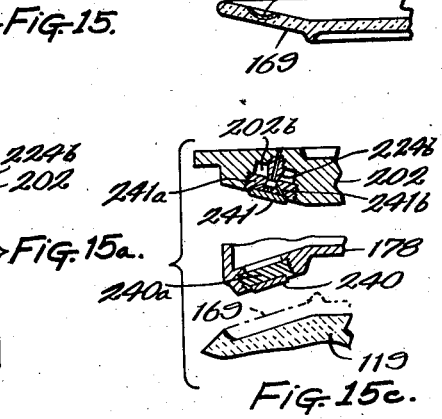
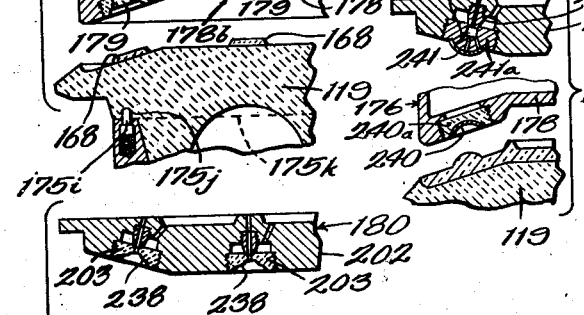
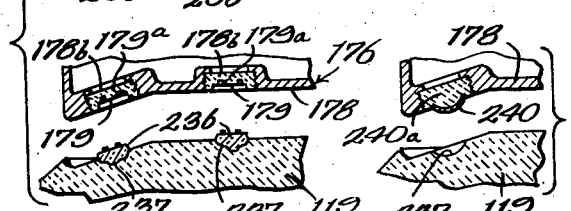
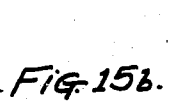
INVENTOR
WILLIAM J. MILLER
BY
ATTORNEY Sept. 10, 1946.  W. J. MILLER  2,407,321
APPARATUS FOR PRODUCING POTTERY WARE
Filed Jan. 8, 1943  16 Sheets-Sheet 7

INVENTOR.
WILLIAM J. MILLER
BY
ATTORNEY.

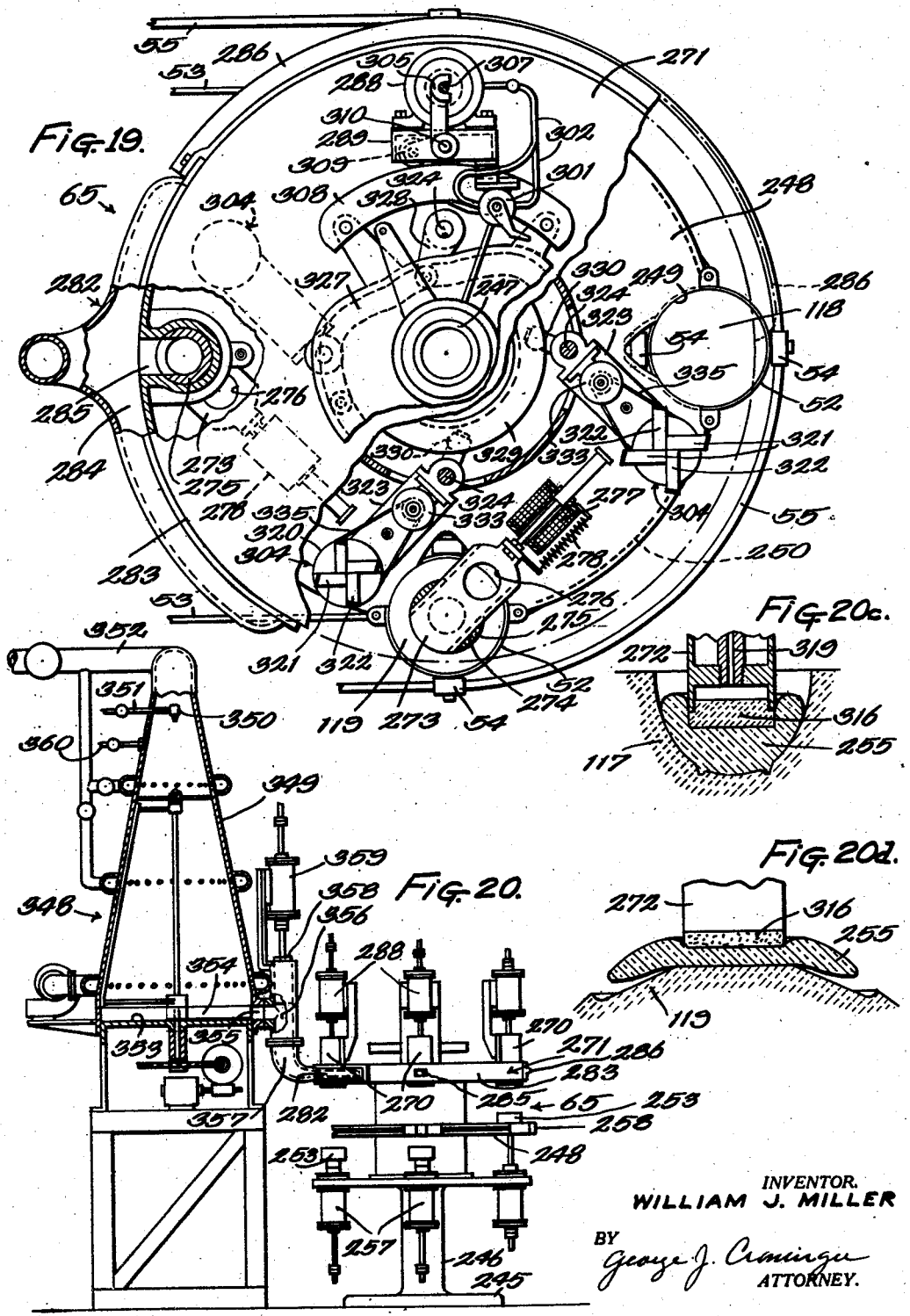

Sept. 10, 1946. W. J. MILLER 2,407,321
APPARATUS FOR PRODUCING POTTERY WARE
Filed Jan. 8, 1943 16 Sheets-Sheet 9
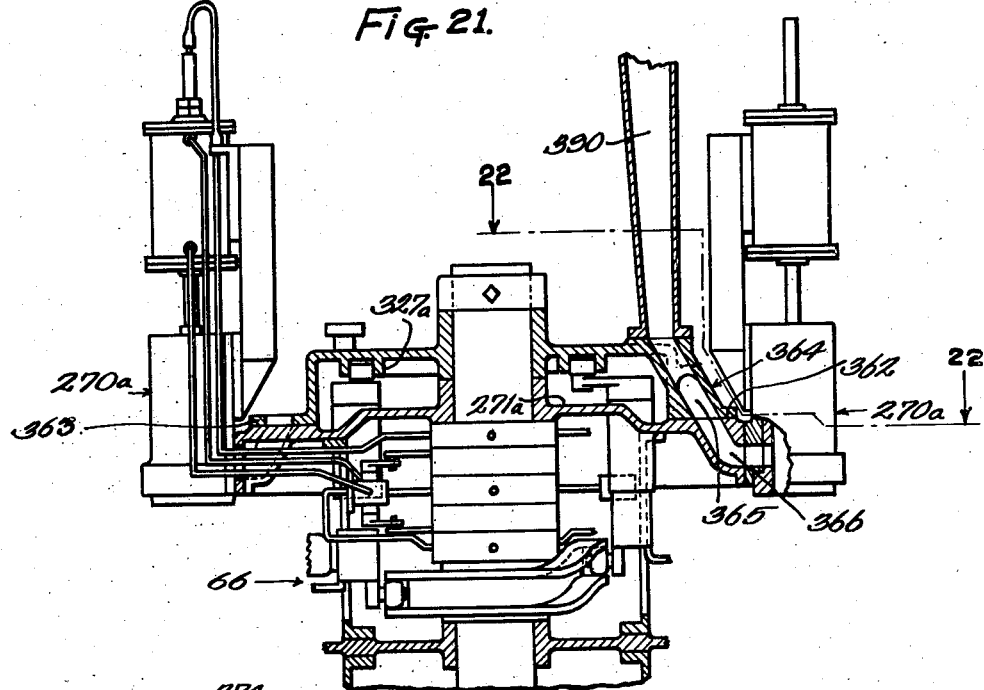
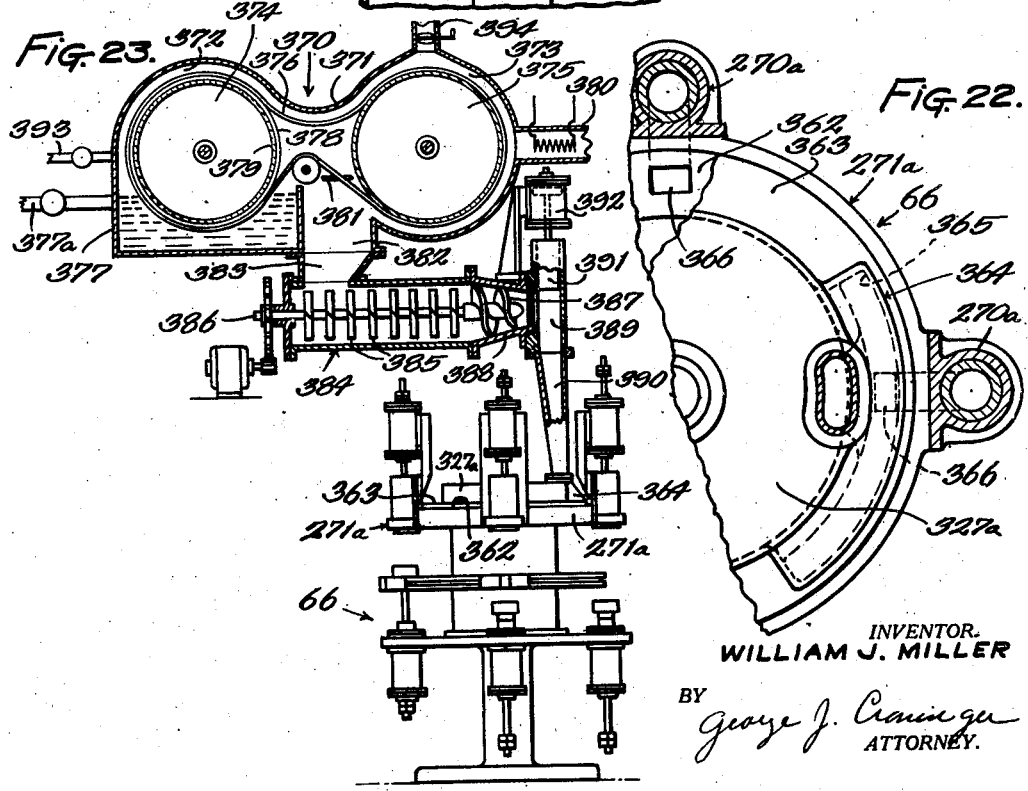
INVENTOR.
WILLIAM J. MILLER
BY
George J. Crainger
ATTORNEY.

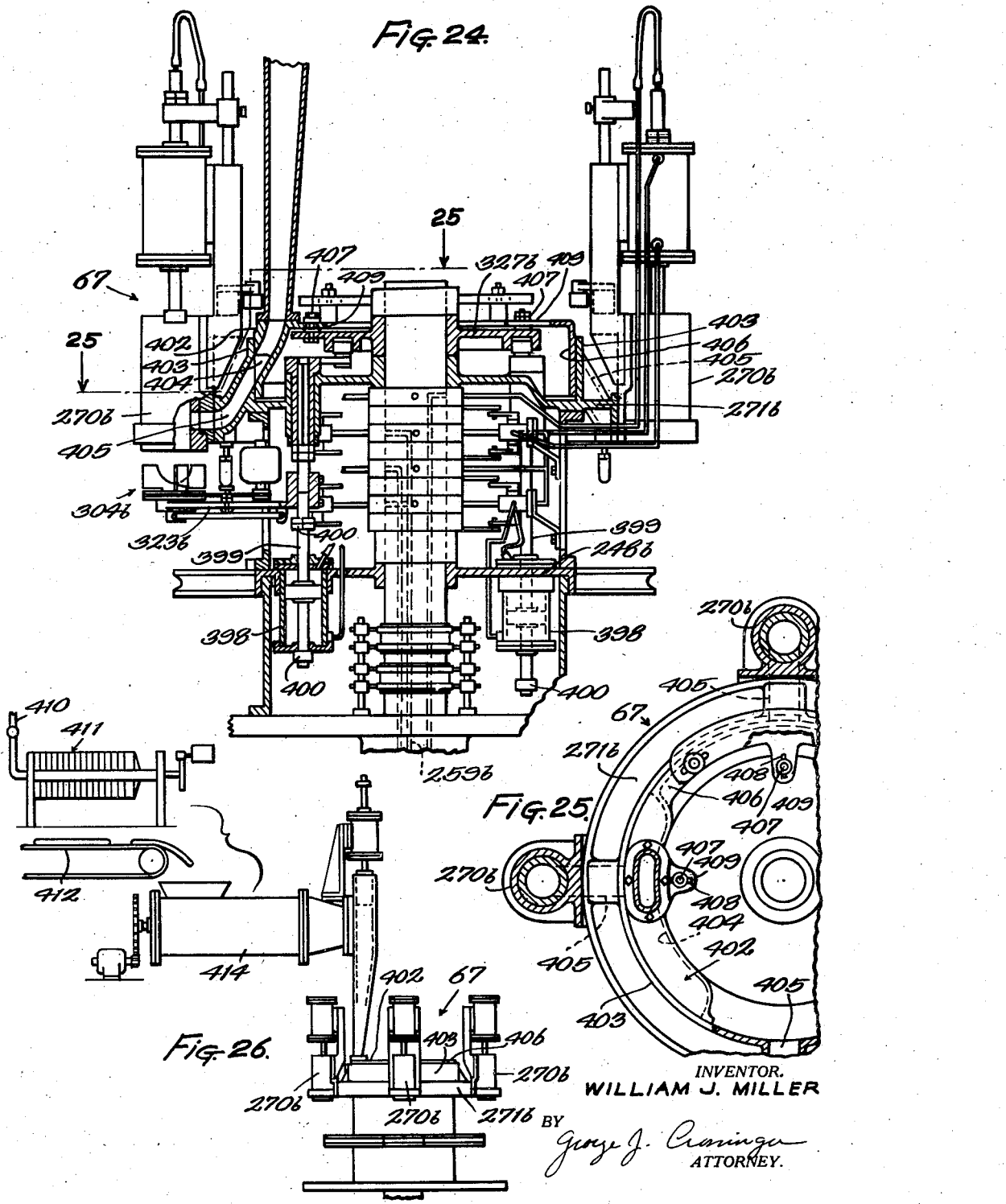

Sept. 10, 1946.  W. J. MILLER  2,407,321
APPARATUS FOR PRODUCING POTTERY WARE
Filed Jan. 8, 1943  16 Sheets-Sheet 11
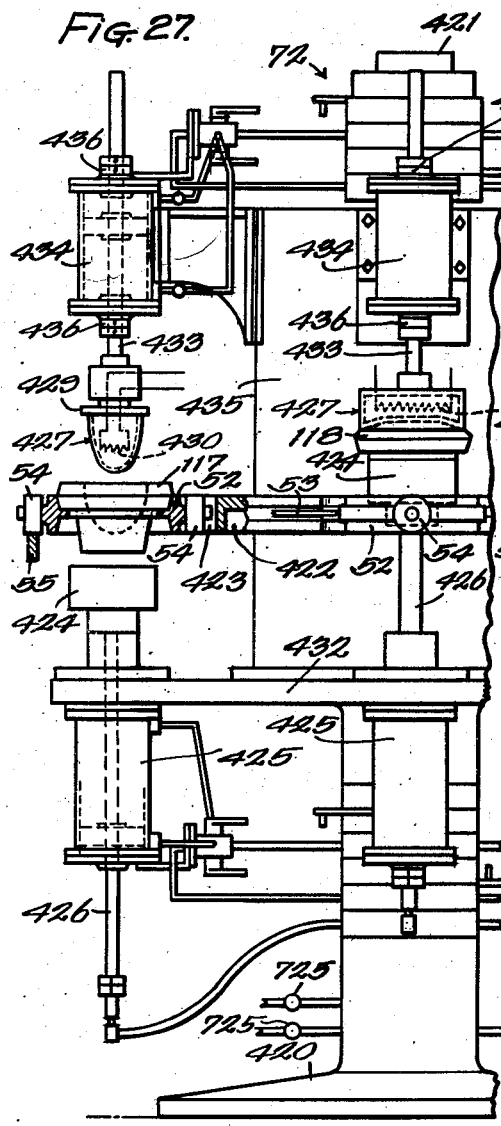
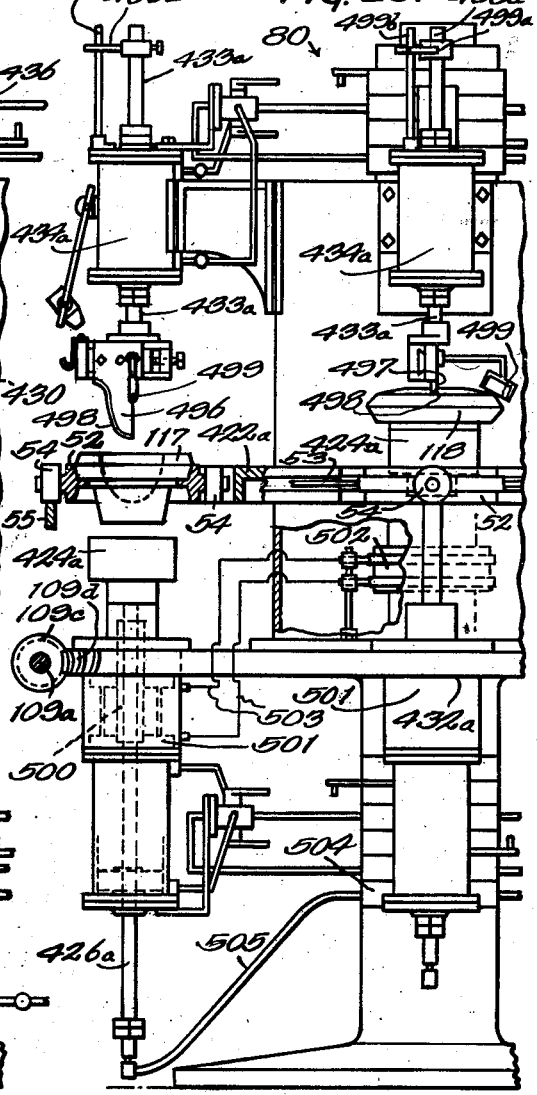
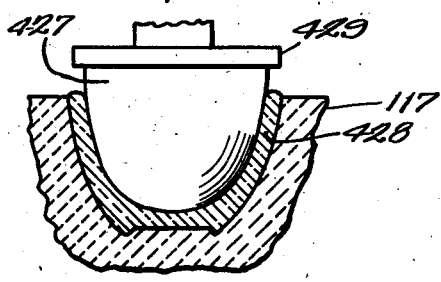
INVENTOR.
WILLIAM J. MILLER
BY
George J. Croninger
ATTORNEY.

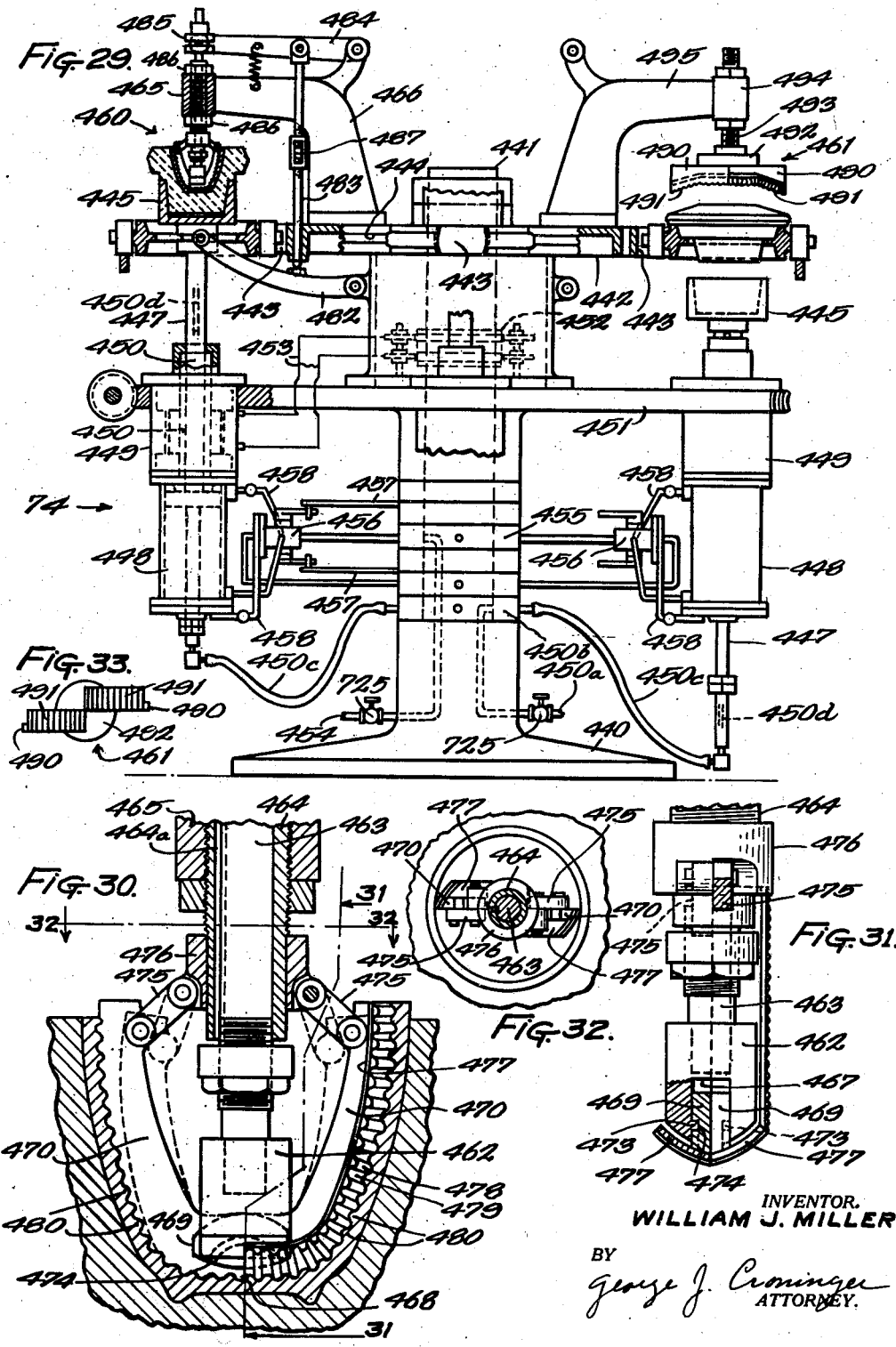

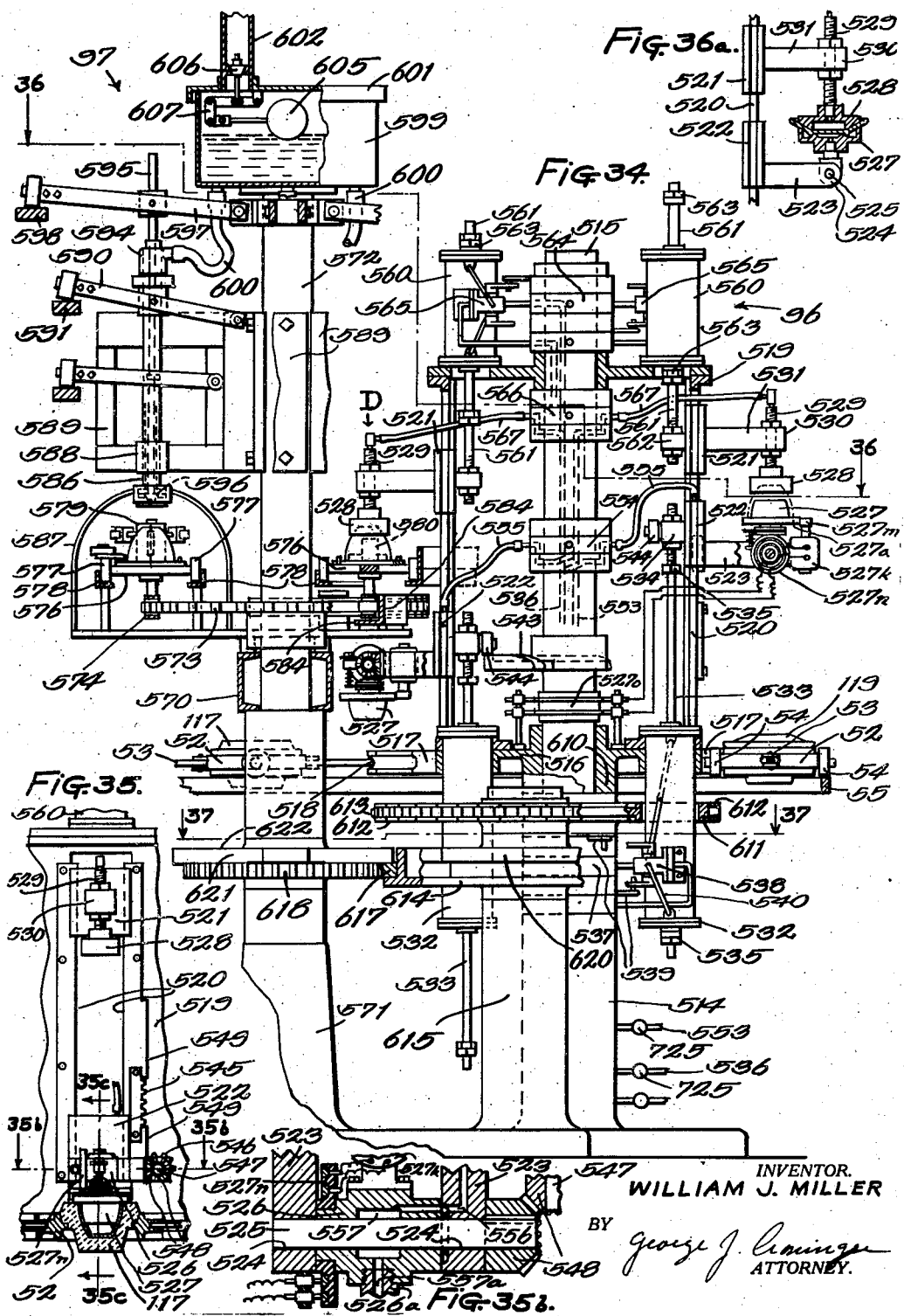

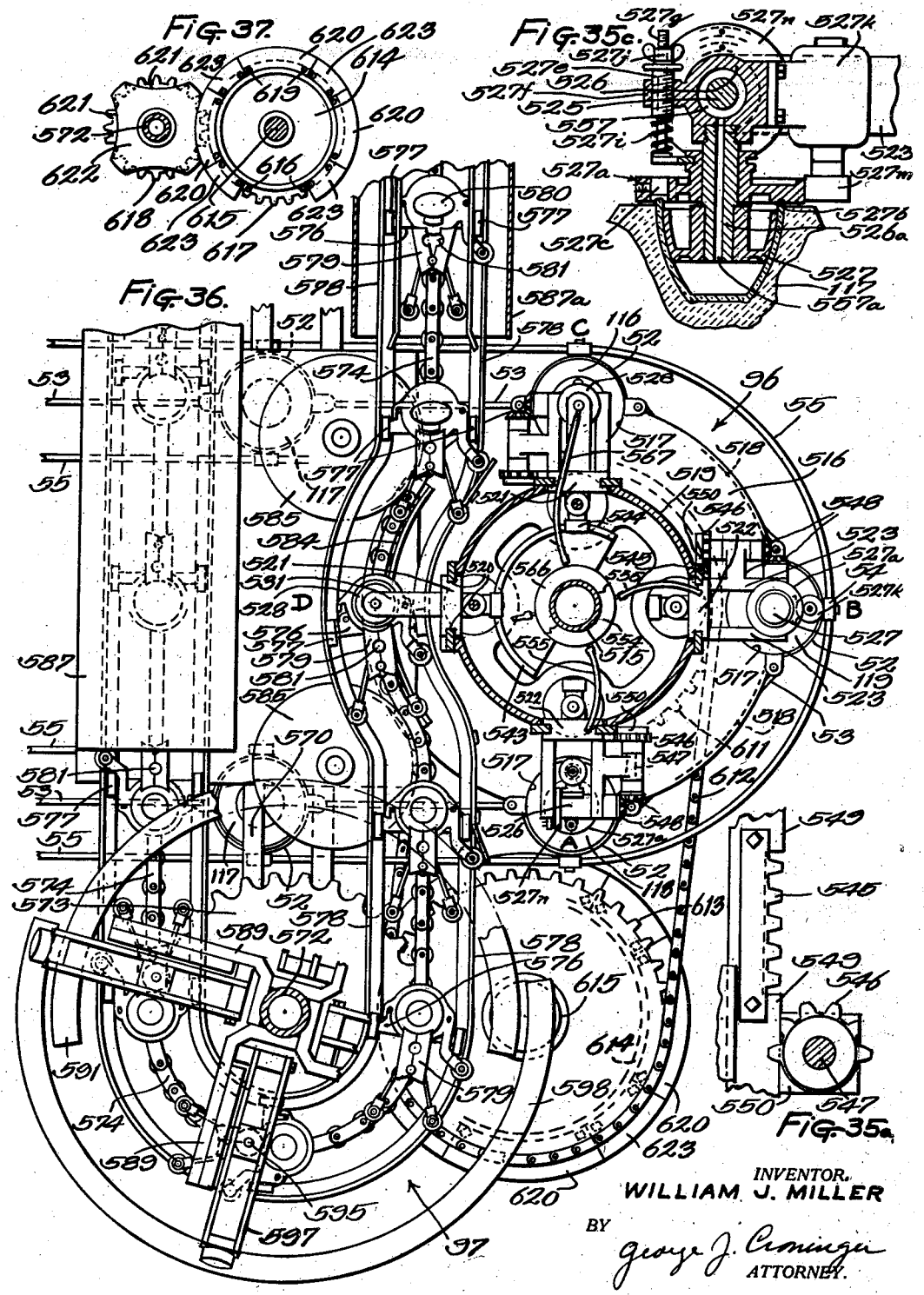

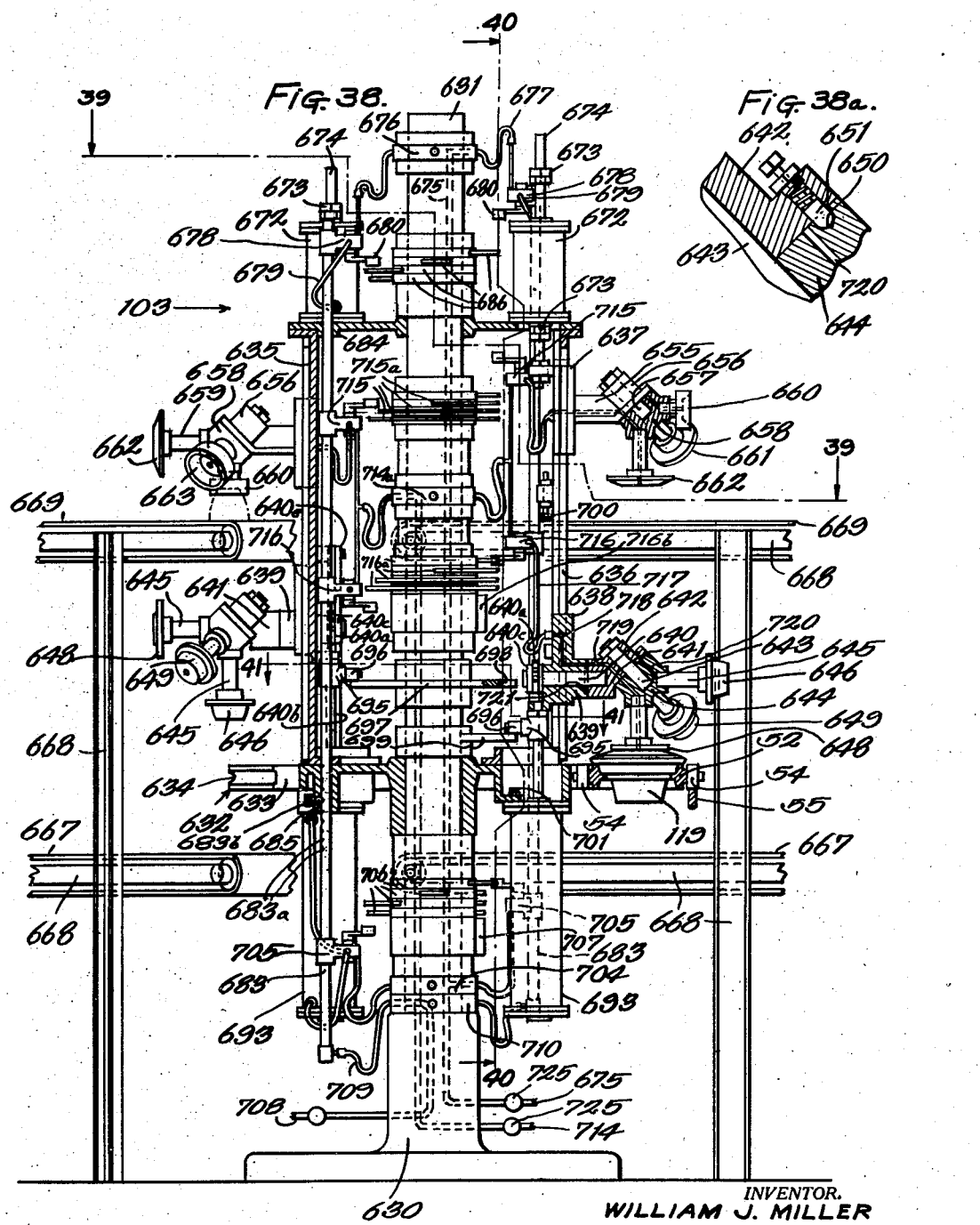

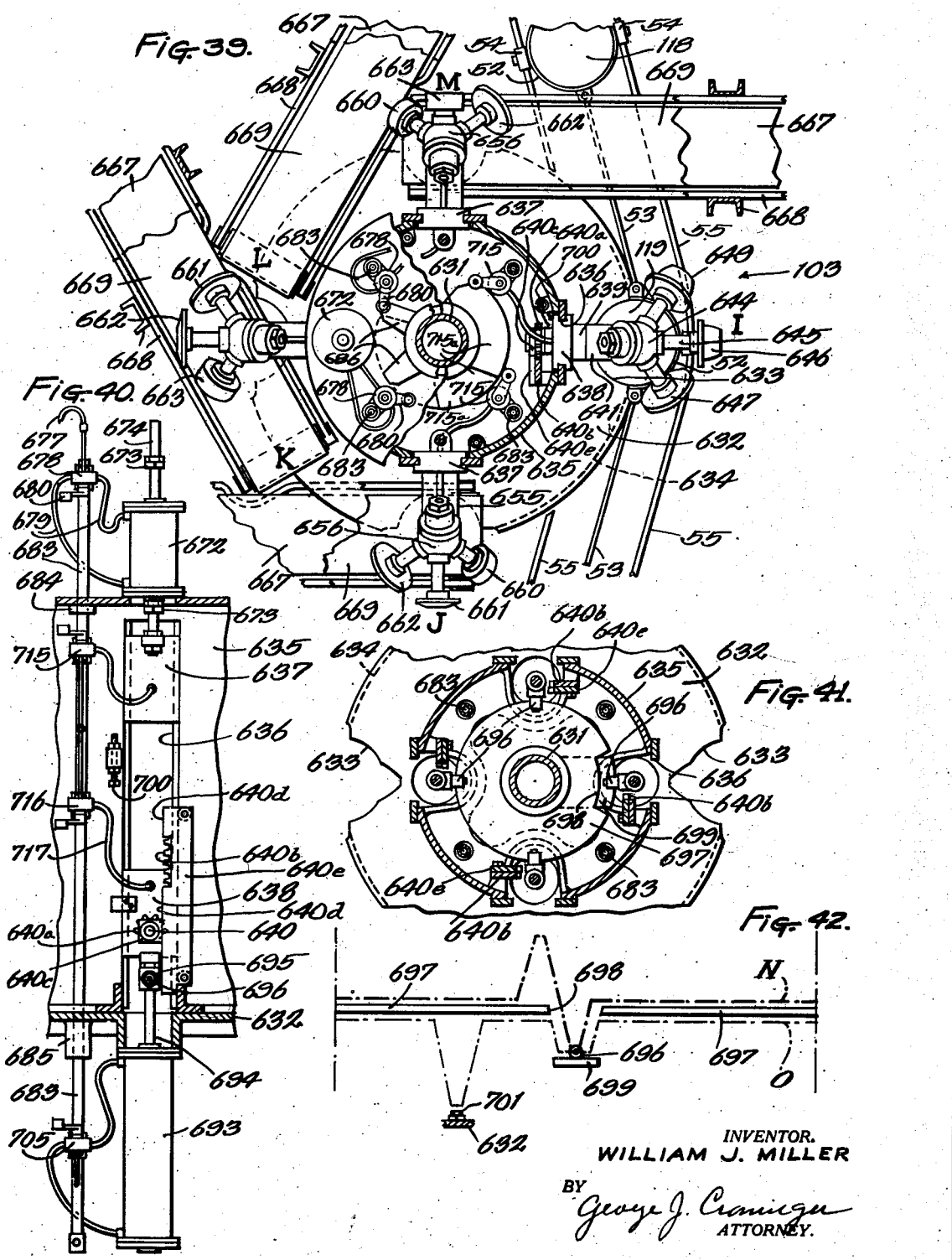

Patented Sept. 10, 1946

2,407,321

UNITED STATES PATENT OFFICE 2,407,321

APPARATUS FOR PRODUCING POTTERY WARE

William J. Miller, Swissvale, Pa., assignor to Miller Pottery Engineering Company, Swissvale, Pa., a corporation of Pennsylvania Application January 8, 1943, Serial No. 471,704

47 Claims. (Cl. 25—22)

This invention relates to apparatus for manufacturing pottery ware. It has to do particularly with the manufacture of ware such as jiggered dinnerware, for instance, plates, cups and saucers, bowls and the like.

The mass production of pottery ware by automatic machine and processes has involved a certain amount of manual intervention, particularly in the treatment and preparation of raw materials and in certain phases of clay, ware and mold transportation, manipulation and processing.

One of the objects of this invention is to place the manufacture of pottery ware on as near a fully automatic basis as possible all the way from the raw material stage to that of dried product ready for first firing. By substantially eliminating the human element in this respect, it is possible to remove handicaps which have heretofore interfered with the continuity, quality and rate of production.

Another and perhaps more important object of this invention is to provide for making simultaneously several different kinds of ware, that is to say, ware having differences in shape, size, decorative pattern or material and even composition by means of a single, unitary mechanical organization. This invention comprehends machinery capable of performing many and different steps, and combinations of steps in the manufacture of pottery ware some of which are conventional steps or operations and others of which afford new and improved ways and means of making pottery ware of this class.

The machinery of the present invention is so constructed and arranged that different sequences of operations may be performed at the same time and variations in the sequences and procedural steps may be made at will and in some cases while the machinery is in operation. Thus, insofar as production diversification is concerned, it may be varied from one which is highly diversified to one wherein substantially little or no diversification occurs. Thus, I provide in a single unitary installation the means of meeting the daily requirements of the average pottery whether it be for large or small amounts of pottery of given shape or design and it is well known that these requirements may vary widely, particularly if the pottery merchandizes a large number of shapes and designs.

Instead of the intermittent fabricating system as illustrated in the patent to Miller No. 2,046,525, I propose to make the present system continuous, somewhat as shown in the application to William J. Miller, Serial No. 413,734, filed October 6, 1941. That is to say, from the beginning of fabricating operations to the point when the ware is removed from the dryer and therebeyond, the materials will move in continuous fashion whilst the various fabricating operations are performed. This makes for increased production speeds and raises the capacity of the machinery. Furthermore, clay is supplied to the fabricating portion of the present mechanical organization by a system and apparatus disclosed in application Serial No. 454,716, filed August 13, 1942, to William J. Miller.

In the drawings:

Figs. 1, 2 and 3 taken together to match end to end in their order lengthwise from left to right constitue a diagrammatic view in plan of the entire ware production system of the invention.

Fig. 4 is a vertical section of a rotary type mold conditioning machine of the system, a similar type of which is also employed to condition the ware during fabrication.

Fig. 4a is a detail showing a contact type mold oiler for use with the machine of Fig. 4.

Fig. 5 is a plan section of the conditioning machine as taken substantially on the section line 5—5 of Fig. 4.

Fig. 6 is a detail plan section taken on the section line 6—6 of Fig. 4.

Fig. 7 is a view partly in elevation and partly in section of one of the rotary decorating machines of the system employed to either decorate the ware directly or through intermediation of the molds.

Fig. 8 is a plan section of the decorating machine, as taken on the irregular section line 8—8 of Fig. 7.

Fig. 8a is a detail plan section taken substantially on the section line 8a—8a of Fig. 7.

Fig. 9 is a detail plan section taken on the section line 9—9 of Fig. 7.

Fig. 10 is a detail elevation of one of the decorating organizations of the machine of Fig. 7.

Fig. 11 is an enlarged detail view of a mutilated gear and rack assembly seen in Fig. 7.

Fig. 12 is an enlarged detail plan section taken substantially on the section line 12—12 of Fig. 10, with certain parts in changed position.

Fig. 12a is an enlarged detail plan section taken on the section line 12a—12a of Fig. 7, illustrating one of the pump units employed.

Fig. 13 is an enlarged fragmentary sectional view of a number of associated ware decorating parts seen in Fig. 7 with said parts brought closer together than seen in said figure.

Figs. 14, 15, 15a, 15b and 15c are views illustrating modified forms of the parts seen in Fig. 13 for producing various decorative patterns or formations on the ware directly or indirectly through the molds.

Fig. 16 is a fragmentary sectional view of a piece of ware decorated by the parts seen in Fig. 13.

Fig. 17 is a fragmentary sectional view of a piece of ware decorated by the parts seen in Fig. 14.

Fig. 17a is a fragmentary view of a piece of ware decorated by the parts seen in Fig. 15b.

Fig. 17b is a fragmentary view of a piece of ware decorated by the parts seen in 15a.

Fig. 19 is a plan section of the said feeder as taken substantially on the irregular section line 19—19 of Fig. 18.

Fig. 20 is a view in reduced scale showing the said feeder in supplied association with a clay desiccating device seen in vertical section.

Figs. 20c and 20d are views illustrating the manner in which the charges seen in Figs. 20a and 20b are finally fed to their respective molds.

Fig. 21 is a central section of the upper part of another rotary clay charge feeder of the system and constituting a modified form of the feeder of Fig. 18.

Fig. 22 is a fragmentary plan section of said feeder taken substantially on the section line 22—22 of Fig. 21.

Fig. 23 is a view in reduced scale showing the feeder of Fig. 21 in supplied association with a continuous clay filter.

Fig. 24 is a vertical central section of another rotary clay charge feeder of the system.

Fig. 25 is a fragmentary plan section of said feeder taken substantially on the section line 25—25 of Fig. 24.

Fig. 26 is a view in reduced scale showing the feeder of Fig. 24 in supplied association with an ordinary type of pug mill.

Fig. 27 is a fragmentary elevation of a rotary press of the system.

Fig. 27a is an enlarged fragmentary sectional detail of one of the dies of the press co-operating with a mold.

Fig. 28 is a fragmentary elevation of a rotary jigger of the system.

Fig. 29 is a sectional elevation of a rotary puddling machine of the system.

Fig. 30 is an enlarged detail section of one of the hollow ware puddling heads seen in Fig. 29.

Fig. 31 is a detail vertical section taken substantially on the section line 31—31 of Fig. 30.

Fig. 32 is a detail plan section of the puddling head of Fig. 30, as taken on the section line 32—32.

Fig. 33 is a bottom plan of the flat ware puddling head seen in Fig. 29.

Fig. 34 is a view in sectional elevation showing one of the rotary hollow ware, or cup, transfer machines in association with an appendaging machine.

Fig. 35 is a front elevation of one of the ware transferring units of the said transfer machine.

Fig. 35a is an enlarged detail of the gear and rack assembly seen in Fig. 35.

Fig. 35b is a detail plan section taken on the section line 35b—35b of Fig. 35 with parts in changed position.

Fig. 35c is an enlarged detail section taken on the section line 35c—35c of Fig. 35.

Fig. 36 is a general plan section taken substantially on the section line 36—36 of Fig. 34.

Fig. 36a is a sectional detail of cooperating flatware pick-up and transfer chucks that may be employed for the machine of Fig. 34.

Fig. 37 is a detail plan section of an intermittent motion gearing connection partly seen in Fig. 34, and as substantially taken on the section line 37—37 of Fig. 34.

Fig. 38 is a central vertical section of another rotary transfer machine of the system.

Fig. 38a is an enlarged sectional detail of one of the transfer devices seen in Fig. 38.

Fig. 39 is a sectional plan view of the machine of Fig. 38, as taken substantially on the irregular section line 39—39 of said figure.

Fig. 40 is a detail vertical section taken on the section line 40—40 of Fig. 38.

Fig. 41 is a detail plan section taken substantially on the section line 41—41 of Fig. 38.

Fig. 42 is a motion diagram illustrating movements of certain parts of the machine of Fig. 38.

*Production system in general*

Figure 1:
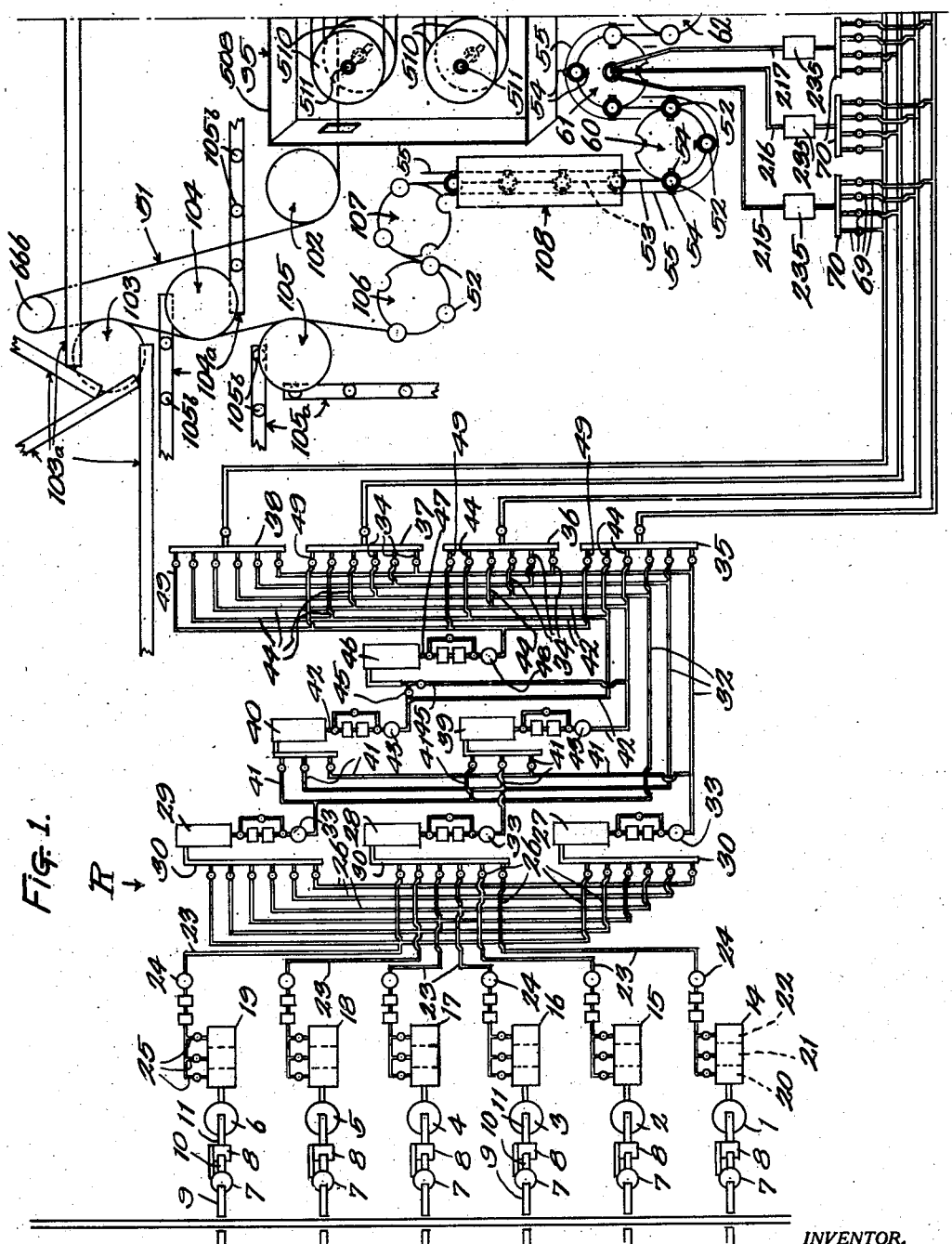
Figure 2:
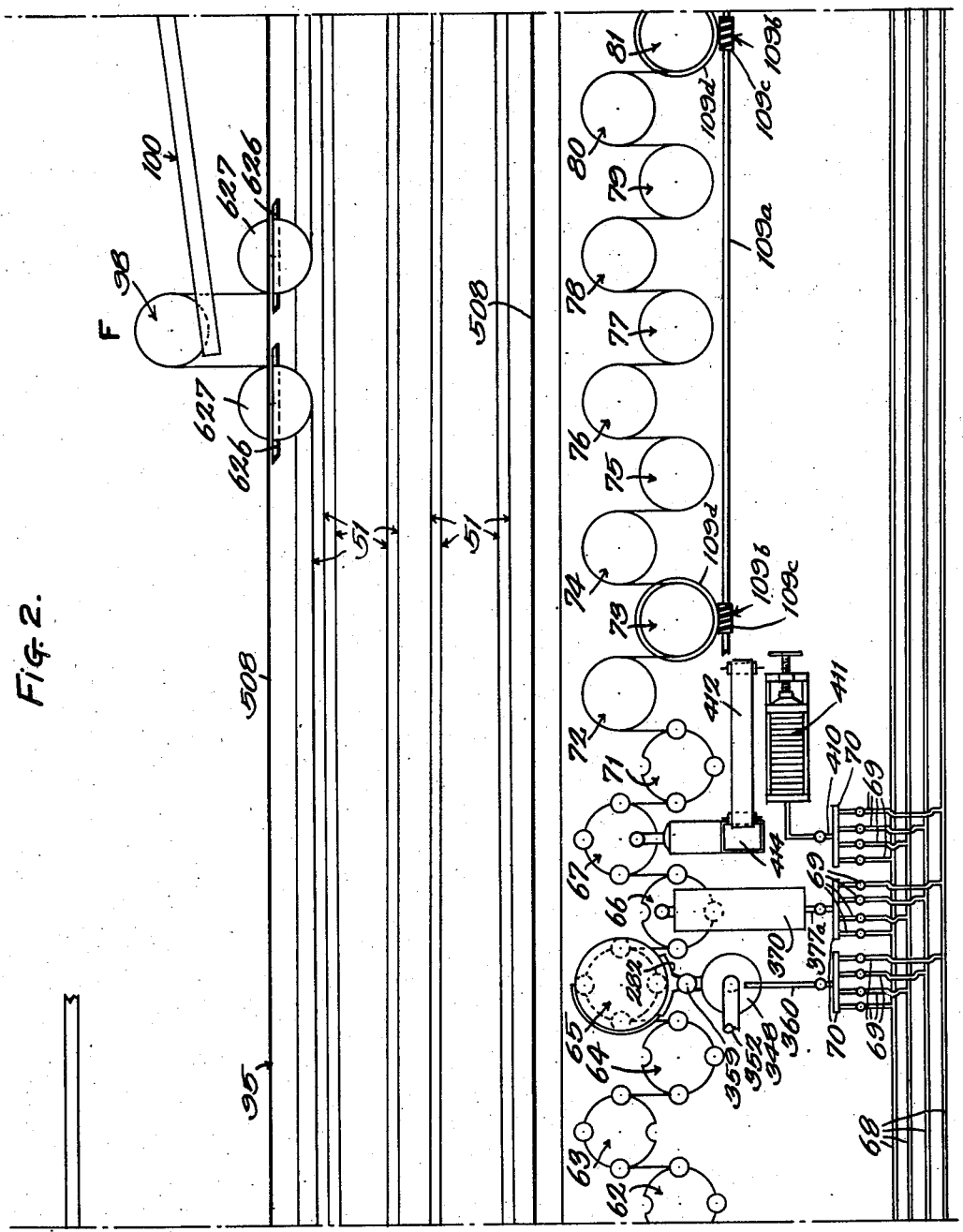

As illustrated diagrammatically in Figs. 1 to 3, the system includes an endless flexible mold conveyor 51 comprising a series of centrally open mold carriers or positioning rings 52 interconnected in equally spaced relation by flexible links or cable sections 53. The conveyor is maintained in a substantially horizontal plane while travelling continuously in a tortuous path about idler sprockets and rotary machines of the system by having outboard supporting rollers 54 riding on rails 55 (see Figs. 4 and 5).

The molds for forming four types of ware are carried in the rings 52 in duplicate successive sets which, in the course of the conveyor, are brought into co-operative relation with a series of rotary machines 60, 61, 62, 63 and 64 designed to respectively condition the molds, treat molds for a certain method of ware decoration, treat molds for another method of ware decoration, further condition the treated molds and treat molds for engobing certain ware. These machines are selectively used.

The molds then continue to a series of rotary machines 65, 66 and 67 designed to selectively feed clay charges of similar or of different composition or conditioned clay bodies to the molds and puddle and partially form the charges correlatively with respect to the ware forming surfaces of the molds prior to feeding. The charge feeding machines may be supplied from an enclosed clay preparation organization "R" designed to simultaneously and continuously prepare the various clay bodies desired from the various plastic and non-plastic materials required and selectively feed same to the machines.

After receiving the charges, the molds continue to a series of rotary machines 71 to 93, inclusive, designed to selectively perform various forming, conditioning and decorating operations to produce the ware as more fully hereinafter described.

The molds then pass through a drier 95 for an optimum period to dry to leather hardness certain ware to be appendaged, such as cups or the like, which are then conveyed out of the drier at a take-off station E to a rotary machine 96 which transfers same from an upright position in the molds to an inverted position in co-operative relation with an appendaging machine 97, the transfer machine also being designed to fettle and smooth the ware prior to being transferred.

The molds are then returned into the drier and are conveyed past take-off stations F and G located along the conveyor course and are brought at predetermined points into co-operative relation, respectively with rotary machines 98 and 99 designed to transfer other types of ware, each requiring a different drying period, to suitable conveying apparatus 100 and 101 arranged to convey the ware to suitable locations for further treatment. These machines are also designed to fettle, smooth and reverse or reposition the ware incident to transferring same, if desired.

Upon leaving the drier, the molds are advanced to a rotary machine 102 employed to lay to the molds or reform thereon partly dried ware that may have become slightly distorted during drying and being especially of use as located, in an installation or an adaptation of the system wherein no type of ware is completely dried in the dryer. However, if the system is adjusted so that the ware leaving the dryer is too dry for the reforming operation, said machine 102 or number of same may be disposed along the conveyor course adjacent one or each of the take-off or transfer stations E, G, and F.

From the reforming machine 102, the molds continue to another rotary transfer machine 103 co-operating with a conveying system 103a to transfer the various types of ware that may remain on the conveyor to any one or a number of selected locations for further treatment, the machine being designed to fettle and smooth the ware and reverse the position thereof if desired.

Upon leaving the transfer machine 103, the empty molds are advanced to a rotary machine 104 co-operating with a conveying system 104a to remove any one or all the molds of each set and transfer same to a suitable location for storage when changing the system over to the production of a different type or types of ware, or when damaged or worn molds require replacement for repair.

The next machine 105 along the course of the conveyor is also of the rotary type designed to co-operate with a conveying system 105a for transferring molds for a certain type or types of ware from one or more storage locations and placing same in the emptied mold carriers in any desired order.

The molds then continue to a rotary conditioning machine 106 designed to remove any foreign matter from the molds, and then continue to another conditioning machine 107 employed to apply to all the molds, or only those which have just been placed on the conveyor, a conditioning medium, such as oil. The molds then pass through a conditioning zone 108 comprising a tunnel within which the air is suitably heated or otherwise conditioned to dry or otherwise put the molds in a proper condition as they return to complete another cycle of operation.

Generally, the machines are of the rotary table type, about the tables of which the conveyor meshes to remain in co-operative relation with each machine during a sufficient portion of its rotation to perform the various operations on the molds or ware.

As seen in Figs. 2 and 3, a power unit 109, such as a combination motor and adjustable speed reducer is employed to constantly drive the machines and mold conveyor in synchronism, through a power shaft 109a and suitable gearing 109b co-operating between same and the rotary machines 73, 81 and 93 which thus serve as driving connections for the conveyor at spaced intervals therealong and whereby the conveyor in turn serves as a driven connection for the rotary machines with which it meshes between said intervals. It is also contemplated that the conveyor and any number or all of the said rotary machines and idlers defining its course may be independently or collectively driven in timed relation.

*Conditioning machine*

Conditioning of the mold and clay surfaces may require the application thereto under pressure, or otherwise, of heated air, certain gases, oil, or other fluid conditioning media to clean or otherwise improve the efficiency thereof.

Accordingly, the conditioning machine 60 (see Figs. 4, 5 and 6) comprises a base 110 of a pedestal 111 supporting the lower end of a central hollow stationary shaft 112 on which rotates a turret or table 113. The table is constantly rotated in a counter-clockwise direction by the mold conveyor 51, by having four pockets 114 spaced about the periphery thereof and grooves 115 therebetween to receive the mold carriers and cable sections of the conveyor as it meshes therewith to an optimum degree therearound.

As the bowl, cup, saucer and plate molds 116, 117, 118 and 119, placed in predetermined order in successive carriers of the conveyor, are carried about the table, each is elevated to a predetermined extent and rotated by a chuck 120 under the path of a laterally oscillating nozzle 121 which is adjusted to jet or spray the desired amount of conditioning medium over a predetermined portion or all of the ware forming mold surface.

The mold chucks 120 are mounted on the top ends of vertical piston rods 122 of piston and cylinder type fluid pressure motors 123 secured to a table 124 arranged under and connected with the table 113. Each piston rod has a vacuum duct 125 opening into the chuck and connected with a vacuum line 126 in the shaft 112 through a distributor 127 and hose 128 to vacuumize the chuck cavity at the proper time to secure the mold to the chuck while rotating same. For rotating each chuck, its piston rod extends through and is in sliding key connection with the hollow shaft 129 of an electric motor 130 energized at the proper time from any suitable source of current through a combination distributor and switch 131 on the central shaft 112. Each fluid motor is energized at the proper time from a fluid pressure line 132 through a distributor 133 and a four-way valve 134 operated by adjustable arms 135 on the central shaft 112 and connected with both ends of the motor cylinder by valved conduits 136 to regulate the speed of travel and extent of up-dwell of the chuck.

Each nozzle 121 is mounted for vertical adjustment, to accommodate various heights of molds and approach to molding surfaces, upon a depending hollow stem 138 at the end of a horizontally disposed hollow arm structure 139 having an upright trunnion 140 supported in a bearing 141 of a spider 142 mounted on uprights of the table 113. The arm structures are oscillated during each cycle of rotation of the table by a cam 144 on the shaft 112 co-operating with rollers 145 on arm extensions 146 of the arms and a spring 147 for maintaining the arms in contact with the cam. Each arm structure comprises inner and outer pipe-like sections 139a and 139b held in telescoped connection by a set screw 139c whereby the structure may be lengthwise adjustable to position the nozzle so that it will spray a predetermined portion of the mold across or away from the axis thereof as it oscillates thereover.

The mold oiler of Fig. 4A is attached to the conditioning machine by stem 160d. 160e is a casting having a porous cushion insert 160h which is fed through holes 160g with oil from an overhead cavity 160f. Oil is fed into the cavity from a tank 160a through hose 160b, a valve 160c being provided to regulate the flow. When the mold is pushed against the porous cushion, the oil is squeezed out of the cushion and applied evenly to the surface of the mold. Being resilient, the cushion conforms to the surface contour of the mold. The tank may be disposed on the axis of rotation of the conditioning machine to supply several oilers or each oiler may have an individual tank. Mold oiling is a necessary operation in the manufacture of ware of this class. Oiling prohibits excessive absorbtion of water by the mold and retards hydraulysis. Furthermore, the capacity of the mold to absorb water can be regulated by the amount of oil it absorbs before the wet clay bat is applied. Therefore, it is important that some control be exercised over the amount or quantity of oil applied to each mold which may vary depending on the type or kind of mold being serviced. The machine is provided with automatic valves which may, if desired, be connected to pipe 160b to valve only a given quantity of oil into reservoir 160f to thereby maintain a substantially constant static head. By valving greater or less quantities of oil each cycle the flow may be varied by varying the static head. The valving operation would, of course, be automatic and performed while the oiling head revolved with the mold about the axis of the turntable.

Each nozzle may be supplied with the same or a different conditioning medium, as required, from four different sources of supply of various media under pressure by way of mains 148, 149, 150 and 151. To this end, each main has valved branches 152 leading, respectively, to headers 153 of four conduits 154, each of which is connected with a nozzle by way of a distributor 155, a flexible conduit 156, a swivel coupling 157 on the trunnion of each arm and a passage 158 in the trunnion communicating with the nozzle through the arm sections 139a, 139b and stem 138.

For salvaging the excess conditioning media, and/or to dispose of the foreign matter, such as clay particles, dust, dirt, etc. removed from the molds during the conditioning operation, an exhaust hood 160 is mounted on each nozzle for vertical adjustment and connected with an exhaust pump 161 through a flexible conduit 162, a distributor 163 and a conduit 164.

*Decorating machine*

Of the various methods to be employed in decorating the ware, one is to apply the decorating medium to the mold to be transferred to the ware as it is formed thereon. Another method is to apply the decorating medium directly to the ware either immediately or during a predetermined time after jiggering or before or after it has been fired. Then again, the medium may be a dye or enamel or the like, or it may be colored clay applied to the ware to form inlayed or incrusted or embossed ornamental formations, or it may be impressed into the green ware with or without a coloring medium application.

Therefore, the machine 61 to which the molds are advanced after leaving the mold conditioning machine, has been designed for use in carrying out these various decorating methods, but is illustrated in Figs. 7 to 14 as being adapted to apply, for instance, inlayed or relief ornamental clay formations on a piece of ware 169, as seen in Figs. 16 and 17.

To this end, the machine includes a base 170 of a pedestal 171 supporting the lower end of a central hollow shaft 172 on which rotates a turret 173 having equally spaced thereabout pockets 174 and sheave formations 175 therebetween to respectively receive the carriers and cable sections of the conveyor as it meshes to an optimum degree therearound.

After the mold carriers are positioned in the pockets of the table, each mold is elevated from its carrier by a vertically reciprocable chuck 175a and brought into register with a decorating device 176, which then reciprocates into contact with the mold surface and applies the ornamental clay formations 168 thereon, (Fig. 13) the device remaining in contact with the mold a sufficient period to insure proper application before it is raised to clear the mold and before the mold is lowered by the chuck into the carrier and carried from the machine.

As seen in Figs. 12 and 13 each decorating device, for hollow or flat ware, comprises a hollow head formed by a base portion 177 and a platen member 178 detachably secured to the base by bolts 178a and correlatively formed with respect to the ware forming surface of the mold it co-operates with. Mounted in openings in the platen face, for replacement, are decorating inserts 178b having molding recesses 179 from which the colored clay ornaments are deposited on the surfaces of the mold when the platen contacts same (see Fig. 13). Thus when the ware has been formed on the mold, said ornamentations are inlayed in the normally visible surface or side of the ware, especially flat ware, such as plates as seen in Fig. 16. The inserts of each platen are made of permeable material and, as it contacts the mold surface, air under pressure is forced therethrough to release the clay ornamentations from the recesses and apply them to the mold. Also, the surfaces of the molds may be suitably treated by the machine 61 to cause the ornamentations to adhere thereto, at least temporarily after application.

When each decorating device 176 is raised to its uppermost limit, its position is reversed during the intermediate portion of its stroke to bring its platen into operative relation with a matrix device 180 which supplies charges of variously colored clays to the recesses of the platen. For this purpose, on the table 173 is a concentric supporting drum 181 having spaced therebeout four vertical guideways, each formed by guide bars 182 between which is guided for vertical reciprocation, a crosshead 183. Each crosshead has a pair of lateral arms 184 with bearings 185 rotatably supporting a horizontal shaft 186 on which is a hollow supporting head 187 carrying one of the decorating devices 176. The base of each decorating device has a threaded central boss 188 threaded on a threaded stem 189 of its support head for adjustment with respect to molds, with a lock nut 189a arranged on the stem to hold the device in adjusted positions.

During the intermediate portion of the stroke of each crosshead 183, the shaft 186 carried thereby is rotated 180 degrees to reverse the decorating device, by said shaft having a mutilated gear 190 co-operating with a rack 191 on a bracket 192 of the drum 181 (Figs. 7, 11 and 12). To hold the decorating device in reversed positions during the end portions of its stroke so that its platen engages and disengages the mold and matrix in alignment and clears same before being reversed, the shaft 186 has a square cam 193 arranged to have sliding engagement with guides 194 at the ends of the rack 191.

Arranged in the drum and secured to the central shaft 172 is a grooved cam 195 for co-operating with rollers 196 on the crossheads to reciprocate same in proper timed relation with the conveyor to effect the decorating operation.

As seen in Figs. 7 and 13, each matrix device 180 comprises a hollow head formed by a base 200 and a matrix member 202 detachably secured to the base by bolts 202a and formed correlatively with the platen of its associated decorating device to cover same when engaged thereby. Each matrix head is mounted on a bracket 201 of the drum 181 for adjustment with respect to its associated platen, by its base 202 having an upright threaded stem 202c adjustably held in a bearing 202d of the bracket by nuts 202e. Detachably secured in bored out portions 202b in the matrix face are molding members or inserts 203 for co-operating with the inserts 178b of the platen 178 to mold the ornamentations, the molding members having ports 203a of small diameter from which the colored or natural clay is fed to the molding cavities formed between same and the said platen inserts when engaged thereby.

Incident to filling of the recesses in the platen, and while the platen is lowered into contact with the mold, the decorating head 176 is vacuumized to hold the clay charges in the recesses of the platen inserts before air under pressure is admitted into the head to release the charges when contacting the mold. To this end, as each decorating head moves toward and engages the mold, it is connected successively with a vacuum line 205 and an air pressure line 206 by way of a combination distributor and valve device 207, on the shaft 172, a flexible conduit 208 leading therefrom, a passage 209 in each crosshead leading to an annular passage-way 210 formed between one of the crosshead bearings 185 and the supporting head 187 and passage-ways 211 and 212 formed in said head and the stem 189 thereof (see Figs. 7 and 12).

To further insure retention of the clay charges in the recesses 179 of the platen inserts while the platen is in motion, clay anchoring formations 179a may be provided in or on the bottom wall of the recesses, as seen in Fig. 13.

The ports 203a of the molding members 302 may be selectively supplied from any one of a series of differently colored clay supply lines 215, 216 and 217 by way of valved branches 218 of each line leading to headers 219 of conduits 220, 221 and 222, distributors 223 on the central shaft 172 co-operating with the conduits respectively, piping 224 connecting with the ports through passage-ways 224a in the matrix base 200, nozzles 224b on the matrix member 202 extending in the bores 202b into connection with said ports, and pumps 225 interposed in the piping.

The pumps 225 are of the cylinder and adjustable stroke piston type arranged in sets on the drum 181 for their respective matrix heads, each set being operated simultaneously at the proper time, to feed a predetermined volume of clay, by a normally stationary cam 226 on the central shaft through spring-pressed levers 227 connecting with the pump pistons. To regulate the capacity of each pump in accordance with that required for the ornamentations, each pump (see Fig. 12a) has a piston rod extension 228 extending through an end wall bearing 229 of the pump cylinder with an adjustable stop or nut 230 threaded thereon to engage the bearing in determining the return stroke limit of the piston.

The molding inserts 203 of the matrices may be of permeable material and incident to discharge of clay from the ports 203a thereof, air under pressure may be forced therethrough to eject the charges therefrom by the annular space of the bores 202b formed over said inserts being connected with the air-pressure line 206 by way of a combination distributor and valve 231 on the central shaft, a flexible conduit 232 leading therefrom into connection with the chamber 232a in the matrix head and passages 232b connecting the chamber with the bore portions 202b.

Each of the colored clay supply lines 215, 216 and 217 may supply the same or a different type of clay supplied thereto by the clay preparation system "R," with each line having interposed therein a coloring device 235 to color the clay as it passes therethrough. In this way, the ornamental clay designs applied to the various types of ware may be of the same composition or character as that of the body of the ware so that the drying and firing behavior of both will be the same.

If it is desired to decorate the ware by applying different colored clay incrusted ornamentations in relief, as seen at 236, Fig. 17, same may be produced by forming suitable molding recesses 237 in the molding surfaces of the molds (Fig. 14) and providing the molding inserts 203 of the matrices therefor with corresponding recesses 238 from which the charges are transferred by the associated decorating head 176.

Before the molds are raised off the conveyor carriers by the chucks 175a, they are rotated in the carriers by the chucks into a predetermined angular position with respect to the platens, so that any selected surface formations thereof adapted to receive the charges from the recesses 179 of the platen inserts, such as the recesses 237, may be brought into co-operative alignment therewith. By so spotting the molds eliminates the necessity of their being carried in the carriers in a predetermined angular position.

For this purpose, each chuck 175a is mounted on the top end of a vertical shaft 175b reciprocable within and in sliding key connection with a sleeve 175c rotatably mounted in a bearing 175d of a wheel 175e on the central shaft 172 and connected with the table 173 thereabove. The shaft 175b is reciprocated to raise and lower the chuck by a lever 175f actuated by a stationary cam 175g on the central shaft 172. On the cam is a cam dwell portion 175h which causes the chuck to temporarily halt intermediate its lowered and raised positions when elevated. While the chuck is halted, it is rotated by the sleeve 175c a predetermined amount, to at least complete one revolution, whereby the chuck is caused to be connected with the mold by a spring-pressed key or detent 175i in its upper edge arranged to snap into a notch 175j formed in an annular surface 175k of the mold, upon which surface the detent slides in a depressed position before snapping into the notch and causing the mold to rotate with the chuck into its predetermined angular position before its final upward movement into co-operative relation with the platen (see Fig. 13). After the chuck returns the mold to the carrier, when lowered it is rotated in a reverse direction to its original position by the sleeve preparatory to another cycle of operation. Each sleeve 175c is oscillated or rotated in opposite directions at the proper time by a cylinder and piston fluid-pressure motor 175m carried on the wheel 175e, and on whose piston rod 175n is a rack gear 175o guided in a guideway 175p of the bearing 175d and co-operating with a gear 175q on the sleeve to oscillate same upon reciprocation of the piston (see Fig. 8a). To regulate the angular position to which the molds are rotated by the chucks, each piston rod 175n has an abutment 175r arranged to engage an adjustable stop or screw 175s threaded in a lug of the bearing 175d to limit the forward stroke of the rack gear 175o.

Each fluid motor 175m is energized at the proper time from the air-pressure line 206 through a distributor 206a and a four-way valve 206b operated by adjustable arms 206c on the central shaft and connected with both ends of the motor cylinder by valved conduits 206d to regulate the phase and speed of oscillation of the chuck.

Each shaft 175b may have a central duct 206e opening into the chuck thereon and connected with the vacuum line 205 through a combination distributor and valve 206f and flexible conduit 206g, to vacuumize the chuck to hold the mold therein after same has been angularly positioned by the chuck.

The machine 62 to which the molds are next advanced may be another decorating machine in carrying out the printing method of decorating wherein ceramic pigment, colored paint or other printing media are employed.

This machine may constitute a duplicate of the machine 61 wherein the platens 178 would be adapted to print the ornamentations on the molds from suitably formed pads or cuts 240 provided on decorating inserts 240a detachably secured in the openings of the platen (see Fig. 15c). These pads may be inked by their associated matrix 202 from permeable pads 241 on inking inserts 241a detachably secured in the bores 202b in the matrix face and having a passage or passages 241b therein co-operating between the pad and the associated nozzle 203 in the bore whereby the pad may be constantly or intermittently supplied a measured amount of the printing medium from a pump 225. In this case, the supply lines 215, 216 and 217 would be selectively connected with sources of supply of variously colored printing media, instead of the clay preparation system.

While Fig. 15c illustrates the printing apparatus adapted to print on a plain mold surface, in imparting a plain printed design or adornment to the ware when formed thereon, Fig. 15b illustrates an adaptation of the apparatus for applying the printing medium to a decorating formation 237 of the mold, in producing ware with an integral embossed decorating formation 237a (Fig. 17a) adorned with a colored coating, which coating may be colored clay or any other coating medium. This also applies to the production of ware having recessed decorative formations, as seen at 237b, Fig. 17b.

The machine 63 to which the molds are next advanced, is provided to condition the decorations applied by the machines 61 and 62. Such conditioning may comprise applying a liquid bonding medium and/or a fluid drying medium to the decorations, such as hot air under pressure, to at least partially harden same sufficiently to withstand forming of the ware thereover. For this purpose, this machine may comprise a duplicate of the machine 60, as seen in Fig. 4, with the supply lines 148 to 151 thereof supplying the desired media for different types of decorations.

The molds are then advanced to the machine 64 arranged to further treat certain molds in producing engobed ware with the decorations over the engobing, which may comprise a thin clay coating of a desired color over the ware to enhance the appearance thereof. For this purpose, said machine may comprise another duplicate of the machine 60 (Fig. 4) with the supply lines 148 to 151 supplying the variously colored fluid engobing medium or clay slips of the same or different compositions from the clay preparation system "R" and whereby said medium would be sprayed over the molding surfaces and decorations thereon to be transferred to the ware when formed thereon.

Mold charging

The mold charging machine 65 to which the molds are next advanced to be charged, is designed to feed charges of desiccated clay, when this type of clay is desired for the ware. The machine contains features generally characteristic of the feeder forming a part of the subject matter of my co-pending application Serial No. 413,734, filed October 6, 1941, and certain apparatus forming part of the subject matter of my application Serial No. 443,226, filed May 16, 1942, whereby the charges will be accurately measured and so treated to remove undesirable physical properties therefrom, such as strains, laps or folds which are detrimental to the fabricating, drying and firing behavior of the clay, or appearance thereafter.

Figure 18:
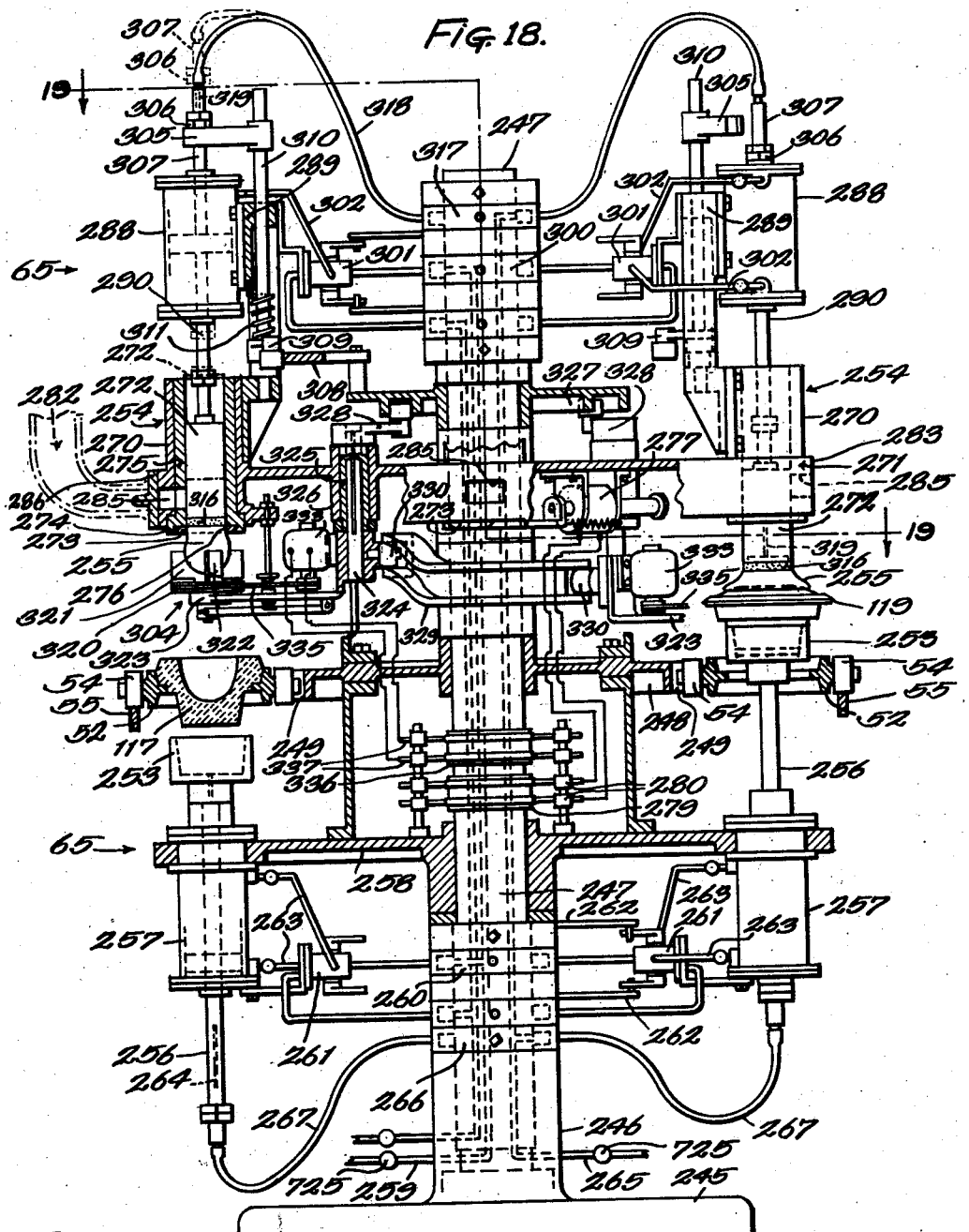
Fig. 18 is a view partly in elevation and partly in section of one of the rotary machines of the system for feeding clay charges to the molds.

As seen in Figs. 18 and 19, this machine comprises a base 245 of pedestal 246 supporting a central hollow shaft 247 on which rotates a turret or table 248. In the edge of the table are four positioning pockets 249 and shave formations 250 to respectively receive the mold carriers and cable sections of the conveyor as it meshes to a major degree thereabout, during rotation of the table. As the mold carriers travel about the table, the mold on each carrier in succession is elevated and lowered by a vertically reciprocating chuck 253 into and out of co-operative relation with a charging unit 254 of the machine which places and bonds a measured and preformed charge of clay 255 onto the center of the molding surface of the mold.

The mold chucks 253 are mounted on the top ends of vertical piston rods 256 of piston and cylinder type fluid pressure motors 257 secured to a table 258 arranged centrally under and connected with the table 248. Each fluid motor is energized at the proper time from a fluid pressure line 259 through a distributor 260 and a four-way valve 261 operated by adjustable arms 262 on the central shaft 247, and connected with both ends of the motor cylinder by valved conduits 263 to regulate the phase and speed of reciprocation of the chuck. Each piston has a central duct 264 opening into the chuck and connected with a vacuum line 265 through a distributor valve 266 and hose 267 to vacuumize the chuck in holding the mold therein while elevated.

The charging units comprise upright charging cylinders 270 arranged co-axially over the table pockets and carried by a wheel 271 spaced above and supported on the table 247. Within each cylinder reciprocates a charging plunger 272 which, when raised to its upper limit, as seen on dot-and-dash lines in Fig. 18, co-operates with a sliding gate 273 at the cylinder discharge end to form a clay charge measuring chamber. The gate for each cylinder comprises a slide plate guided in a guideway 274 across the bottom end of a liner 275 in the cylinder and having an opening 276 arranged to register with the cylinder discharge end when moved to open position. Each gate is opened by a solenoid 277 and closed by a spring 278, the solenoids being carried by the wheel 271 and energized at the proper time from suitable electric power lines by way of a drum type switch 279 on the central shaft 247 co-operating with contacts 280 on the table 258.

Clay is fed into the measuring chambers, during a given portion of rotation of the table, from a stationary feeder head 282 comprising an arcuate feeder channel forming with the edge 283 of the wheel a feeding chamber 284 from which the clay is directed under pressure into the measuring chambers successively by way of radial ports 285 in the wheel edge. From the time the ports 285 leave the feeder head 282 until the charges in the cylinders thereof are discharged, they are closed by an arcuate guard 286 engaging the wheel edge to prevent the escape of clay, as seen in Fig. 19.

Each plunger is reciprocated by a cylinder and piston fluid pressure motor 288 mounted on a bracket 289 of the wheel 271 and having a depending piston rod 290 connecting with the plunger. The fluid motors are energized to operate the plungers at the proper time by means substantially the same as that employed for the motors 257 and including a distributor 300, four-way valves 301 and valved conduits 302 co-operating between the motors and the air pressure line 259.

After each charging cylinder has been filled by the feeding head 282, its gate is opened and the plunger lowered to a position intermediate its feeding stroke to bring the bottom end of the charge into operative relation with a device 304 which puddles, smoothes and preforms the charge and correlatively with the contour of the mold surface for which it is intended, while a small portion of the charge remains in the measuring chamber or slide valve port 276 to prevent displacement thereof on the plunger (see left side of Fig. 18). Halting of each plunger is effected by a movable stop 305 which oscillates into and out of the path of an adjustable abutment 306 on the upper extension 307 of the piston rod 290 carrying the plunger. The stops are moved into stopping position by a stationary cam segment 308 co-operating with arms 309 on upright shafts 310 carried by the brackets 289 and on which the stops are secured, the stops being moved out of operating position by coiled springs 311 co-operating between the brackets and the arms.

Generally, preforming of the charges consists in producing a mold engaging surface on same that will be at least partially correlatively shaped with respect to the ware forming surface of the molds, to initially engage the surface at the center thereof and then progressively engage same radially thereof to force out any air that may otherwise be trapped therebetween when spread thereover. Accordingly, a hollow ware, or cup charge, Fig. 20a may have a smaller arcuately contoured bottom surface 312 than the arcuate contour of the molding surface 313 of the cup mold, and the flat ware or plate charge, Fig. 20b, may have a dished bottom surface 314 provided with a central bulge 315.

Figures 20A, 20B:
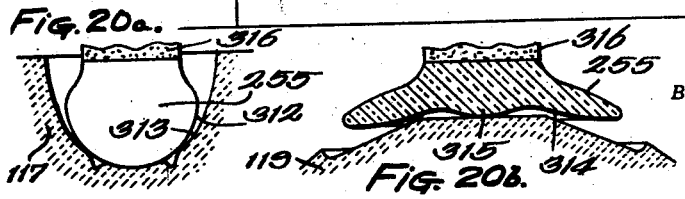
Fig. 20a is an enlarged view of certain parts seen in Fig. 18 showing a preformed charge for hollow ware about to be initially fed to a hollow ware mold.
Fig. 20b is an enlarged view of other parts of Fig. 18 showing a preformed charge for flat ware about to be initially fed to a flat ware mold.

After the charge has been preformed, the puddling and preforming device is lowered therefrom and swings out of its path, and the stop 305 is retracted, whereupon the plunger completes its feeding stroke and the mold is elevated to compress the central portion of the charge onto the center of the ware forming surface of the mold, as seen in Figs. 20c and 20b, whereby the charge will firmly adhere or be bonded to the mold central therewith while being transported to the press. The charge is prevented from adhering to the plunger on its return stroke by the plunger having a permeable bottom end 316 through which, at the proper time, air under pressure is forced from the pressure line 259 by way of a distributor 317 on the central shaft 247 and a flexible conduit 318 connecting same with a central duct 319 continuing through the plunger and piston rod supporting same.

Each puddling device 304 is constructed substantially in accordance with my application Serial No. 443,226, and generally includes a rotating head 320 supporting suitably formed puddling and troweling tools 321 and 322. The base is rotatably mounted at the outer end of a horizontal frame 323 whose other end is secured to the bottom end of a vertical shaft 324 in telescoping keyed connection with a sleeve 325 supported in a bearing 326 of the wheel 271. The sleeve is oscillated to swing the puddling head laterally into and out of central alignment with a charge of clay thereunder, by a stationary cam 327 on the central shaft 247, co-operating with a lever 328 on the sleeve. The shaft 324 is reciprocated, to raise and lower the head into and out of contact with the charge, by a cam 329 on the central shaft co-operating with a roller 330 on the frame 323.

When elevated, each head 320 is rotated, to effect the puddling and preforming operation, by an electric motor 333 on its frame 323 having driving connection with a sheave formation 334 of the head through a pulley and belt drive 335, the motors being energized at the proper time from suitable power lines by way of a drum type switch 336 on the central shaft and co-operating contacts 337 on the table 258.

Conditioned clay is supplied to the clay feeding head 282 from a desiccator 348 into which a desired type of clay slip is fed from the clay preparation system "R" (see Fig. 20). While this desiccator may be of any suitable type, it is preferable to employ the desiccator forming part of the subject matter of my co-pending application Serial No. 454,716.

Briefly, the desiccator includes an upright shell 349 into which is sprayed the clay slip from an atomizer 350 in controlled supplied communication with the clay preparation system to be supplied with the desired type of clay slip, by way of a valved pipe 351 and other means later described. As the atomized clay falls, it is dehydrated by hot, dry air admitted into the shell, from any suitable source, by way of a valved conduit 352. The dehydrated clay falls onto the bottom 353 of the shell from which it is progressed by a rotating snail or deflector 354 through the shell outlet 355 and into a charging cylinder 356. From the charging cylinder, the clay is forced into the feeding head 282 by way of a conduit connection 357 therebetween and a reciprocating plunger 358 in the cylinder operated by a fluid pressure motor 359. The desiccator and charger being in closed communication, prevents contamination of the clay by foreign matter, and to further prevent air entrapment in the clay, the desiccator may be vacuumized by having connection with any suitable vacuum source through a valved conduit 360.

The next machine 66 to which the molds are advanced is provided to feed charges of filtered clay if so desired, and for this purpose may comprise a duplicate of the machine 65, to which the filtered clay may be supplied from a continuous filter. However, as seen in Figs. 21 to 23, this machine constitutes a modified form of the machine 65, with parts similar to those of the latter being designated by like reference characters with an exponent "a."

In this form of the charger, the wheel 271a has a flat concentric annular top surface 362 engaged by a peripheral flange formation 363 of the stationary cam 327a. In this flange is formed a clay feeding head 364 comprising an arcuate channel section forming with said surface 362 a clay feeding chamber 365 from which clay is forced into the charging cylinders 270a by way of ports 366 continuing from the surface.

As a result, this form is more compact than the first form and less wear will occur between the contacting surfaces of the wheel and feeder head because of the lesser amount of surface required on the wheel nearer the axis thereof in co-operating to form the clay feeding chamber, and the comparatively reduced extent of travel thereof.

For supplying clay to the feeding head (see Fig. 23), a continuous clay filter 370 is employed comprising an enclosed housing 371 including a filter chamber 372 and a drying chamber 373 within are arranged, respectively, a rotating filter drum 374 and a rotating dryer drum 375 about which are supported a series of endless parallel cords 376. The filter drum is partly submerged in clay slip contained in a tank formation 377 of the casing supplied from the clay preparation system "R" by way of a valved conduit 377a. As the clay is built up on filter cloth 378 covering the permeable wall 379 of the drum 374, by vacuum created in the drum, it is carried by the cords 376 about the dryer drum 375. After being sufficiently dried on the dryer drum by heated air supplied to the drying chamber 373, through a conduit 380, the clay is stripped from the cords by a stationary comb 381 to fall through a bottom outlet 382 of the housing which connects with the feed hopper 383 of a pug mill 384. The filtered clay is then thoroughly mixed into a homogeneous mass as it is progressed in the pug mill by the usual blades 385 on a central rotating shaft 386 having an auger 387 which forces the clay from the discharge end 388 of the pug mill into a feed cylinder 389 connected therewith. From the feed cylinder, the clay is forced into the feeding head 364 by way of a connecting conduit section 390 and a reciprocating plunger 391 in the cylinder operated by a suitable fluid pressure motor 392.

The structure just described thus provides an enclosed clay treating system between the clay preparation system "R" and the feeder head 364, to prevent contamination of the clay by foreign matter. To further prevent air entrapment in the clay, it is contemplated to vacuumize the filter chamber and the drying chamber by connecting same with a suitable vacuum source by way of valved conduits 393 and 394, respectively, and whereby the desired degree of vacuum may be maintained therein.

The machine 67 to which the molds are next advanced is provided for use in feeding charges of a certain type of clay, wherein it is desired or essential that the clay be filtered by an ordinary filter press.

While this machine could be a duplicate of the charger 65, as seen in Figs. 24 to 26, it comprises another modified form thereof with parts similar to those of the first form being designated by like reference characters having an exponent "b."

In this form of charger, each charge puddling and preforming device 304b is raised and lowered into and out of engagement with a charge by a cylinder and piston type fluid motor 398 supported on the table 248b and having its piston rod 399 connected with the frame 323b carrying the device. On the piston rod may be adjustable stop collars 400 for alternate engagement with end bearings of the motor cylinder to regulate the upper and lower limits of movement of the device with respect to the charges. The motors 398 may be energized from the air pressure line 259b to operate the devices 304b at the proper time, by means similar to that employed to energize the motors 257 and 288.

The charging cylinders 270b may be supplied from a clay feeding head 402 supported on the cam 327b and comprising a channeled arcuate segment forming with the inner wall of a concentric upright annular wall 403 of the wheel 271b, a feeding chamber 404 from which the clay is fed to the cylinders by way of passages 405 continuing from said wall. While the charges are being ejected from the charging cylinders, the passages 404 may be closed, to prevent the escape of clay, by an arcuate guard extension 406 of the feeder head (Fig. 25). The feeder head is mounted on the cam 327b by means of bolts 407 passing through elongated slots 408 in lugs 409 of the head to permit adjustment of same and guard extension thereof into sealing engagement with the wall 403.

As seen in Figs. 2 and 26, the clay to be supplied to the feeder head 403 may be derived from the clay preparation system "R" by way of a valved conduit 410 leading to an ordinary filter press 411 of the bag and frame type. As the filter cakes are removed from the frames of the press, they are placed on a conveniently located conveyor 412 which discharges them into the hopper of a pug mill 414, similar to the pug mill 384 of the second form of charger, and from which the thoroughly homogenized clay is fed to the feeder head by way of means similar to that employed in association with said latter pug mill.

*Clay preparation system*

In the clay preparation system, diagrammatically included in Fig. 1, the raw plastic materials, such as ball, kaolin and china clays and the non-plastic materials, such as flint, silica and spar, are stored in bins 1, 2, 3, 4, 5 and 6, respectively, after each material has been ground to the desired degree of fineness and screened upon passing through a crusher 7 and a screen 8 while being conveyed to its respective bin by suitable co-operating conveyors 9, 10 and 11. From the bins, the various materials are forcefully conducted through suitable conduits to continuously operating blungers 14, 15, 16, 17, 18 and 19, respectively, in each of which the particular material is mixed with a predetermined volume of water, etc., at successive stages of its progression therethrough to form slips varying in viscosity and state of disintegration in successive chambers 20, 21 and 22 of each blunger. Through suitable conduits 23, pumps 24 therein, and valved branches 25 and 26 thereof, selected slips of the various materials are pumped in desired quantities to a series of continuously operating primary material blending and mixing blungers 27, 28 and 29, by way of headers 30, to be mixed into three different clay bodies for various types of ware and/or ware producing methods, such as the dry press method, plastic method and slip casting method.

From each of the clay mixing blungers, the particular clay body may be pumped to one or a number of different types of clay body treatment and/or feeding apparatus for various ware producing methods, by way of a conduit 32, a pump 33 therein, and valved branches 34 thereof leading to headers 35, 36, 37 and 38 from which the various machines are selectively supplied. There are also two secondary mixing blenders 39 and 40 which may be selectively supplied from the primary blungers through valved branches 41 of the conduits 32 to prepare blended variations of the clay bodies in the blungers, each blended clay body being selectively supplied to either one or a number of the headers 35 to 38 through a conduit 42, a pump 43 therein and valved branches 44 thereof. Through valved branches 45 of the conduits 42, desired proportions of the clay bodies in the blenders 39 and 40 may be supplied to a tertiary blender 46 to prepare a blended variation thereof which may also be supplied to either one or a number of the headers 35 to 38 by way of the conduit 47, a pump 48 therein and branches 49 thereof.

The entire system from the blungers 14 to 19 to the headers 35 to 38 is vacuumized to prevent the entrapment of air in the clay bodies, as more fully described in said application Serial No. 454,716.

As seen in Figs. 1 and 2, the clay supply lines or conduits 215, 216, 127, 360, 377a and 410 for the various decorating and clay charge feeding machines, are each in supplied communication with each of the headers 35, 36, 37 and 38 of the clay preparation system by way of a valved main 68 leading from each other header having valved branches 69 connecting with headers 70 of the clay supply lines or conduits.

Conditioning charges

When the molds leave the charger 67 with charges placed therein, they are conveyed to the charge conditioning machine 71 which may comprise a duplicate of the machine 60 adapted to raise or lower the moisture content of the charges or apply a lubricant thereon to facilitate die pressing.

Preforming

The machine 72 to which the molds are next advanced, is a rotary press, and is generally characteristic of the rotary press forming part of the subject matter of my co-pending application Serial No. 413,734.

The means of this machine for supporting the conveyor and for raising and lowering the molds for the pressing operation, is practically the same as that of the charging machine 65, wherein (see Fig. 27) it includes a base 420, a central shaft 421, a rotating table 422 having peripheral positioning pockets 423 for the conveyor carriers, below which are mold chucks 424 raised and lowered by cylinder and piston fluid motors 425 connected with a wheel 432 and upon whose pistons 426 the chucks are secured.

As the conveyor travels about the table 422, the molds are elevated by the chucks 424 into operative relation with pressing dies 427 which spread the charges over the ware forming surfaces of the molds into roughly or partially formed ware shapes with wall portions comparatively thicker than when finally finished, as illustrated in Fig. 27a in the forming of hollow or cupped ware 428. Each die comprises a thin walled permeable or non-permeable shell detachably secured to a base 429 with a compressed air supply conduit or a heating element 430 arranged therein to render it non-adhesive.

The dies are so supported whereby they may be held in a fixed position over the table pockets or raised and lowered into and out of contact with the charges, as the molds are elevated. For this purpose, each die is mounted on the bottom end of a piston rod 433 of a cylinder and piston fluid motor 434 supported on a central bracket 435 on the table 422. On the piston rod are stop collars 436 adjustable thereon to co-operate respectively with the end bearings of the cylinder of the motor 434 in holding the die fixed above its respective table pocket or to regulate the range and limits of movement of the die when reciprocated by the motor. Each motor 434 may be energized from an air pressure line by way of distributor and valve control means similar to that employed for the motors 288 of the charger 65.

Upon leaving the rotary press, the molds are conveyed to another conditioning machine 73 which may comprise a duplicate of the machine 60 adapted to spray a conditioning medium such as water, hot air, etc. over the preformed charges to prepare same to an optimum condition, preparatory to being puddled.

Puddling

The molds are then advanced on the conveyor to a rotary puddling machine 74 designed to remove any strains, laps or other defects to a substantial depth from the exposed surfaces of the preformed charges inherent in the clap or created incident to pressing, feeding, or otherwise.

The means of this machine for supporting the conveyor and operating the molds is practically the same as that of the conditioning machine 60, wherein it includes (see Fig. 29) a base 440 supporting a stationary hollow central shaft 441 on which rotates a table 442 having four equally spaced peripheral positioning pockets 443 and a peripheral groove 444 to respectively receive the mold carriers and cable sections of the mold conveyor.

As the mold conveyor travels about the table 442, each mold is elevated by a mold chuck 445 to bring the preformed charge therein into co-operative relation with puddling head for a given period, and during which time the mold and puddling head are rotated relatively to effect the puddling operation. For operating the chucks, each is mounted on the top end of a vertical piston rod 447 of a cylinder and piston fluid motor 448 secured to the bottom end of an electric motor 449 having a hollow shaft 450 within which the piston rod reciprocates in splined connection to be rotated thereby. When elevated, the chuck is vacuumized to hold the mold fixed therein by being connected with a vacuum line 450a through a distributing valve 450b, a flexible conduit 450c and a central passage 450d in the piston rod 447. The electric motors 449 are carried on a wheel 451, spaced below and connected with the table 442, and are energized to rotate the chucks, when raised, from any suitable power lines through a combination distributor and switch 452 on the central shaft and conductors 453 leading therefrom. Each fluid motor 448 is energized from a fluid pressure line 454 by way of a distributor 455 on the central shaft, and a four-way valve 456 operated by arms 457 on the central shaft and connected with the ends of the cylinder of the motor through valved conduits 458. Generally, the puddling means includes puddling devices 460 and 461 carried on the table 442 and arranged over the pockets 443 to effect the puddling of hollow ware and flat ware shapes respectively (see Fig. 29).

These devices are constructed somewhat in accordance with that part of the invention defined in my co-pending application, Serial No. 443,226, having to do with puddling clay charges.

Each hollow ware puddling device 460 (see Figs. 30, 31 and 32) comprises a central bearing block 462 on the bottom end of a spindle 463 co-axial with the chuck therebelow and mounted for limited reciprocation within a sleeve 464 holding the spindle from rotating through a spline connection 464a, and secured in a bearing 465 of a bracket 466 on the table 442. In the bottom end of the block 462 is a transverse slot 467 within which is mounted to pivot about a horizontal axis and intersecting the axis of the block at a point therebelow, as seen at 468, Fig. 30, the overlapping inner ends 469 of a pair of upwardly and outwardly curved puddling arms 470. The arms are guided to pivot about their common axis by arcuate guide formations 473 formed on the opposed inner walls of the slot 467 and received in arcuate guide grooves 474 formed in the inner ends of the arms. The top ends of the arms 470 are pivotally connected through links 475, with a collar 476 on the bottom end of the sleeve 464 whereby as the bearing block 462 is raised and lowered the arms will expand and contract, as seen in full lines and dot-and-dash lines in Fig. 30.

When a hollow ware mold is raised and rotated, the arms of the puddling device thereover are expanded into engagement with the interior wall of the preformed hollow ware charge in the mold and effect the puddling of same by each arm having a blade 477 with a peripheral puddling edge inclined away from the true circle to effect a trowelling action on the clay, and provided with transverse ridges and grooves 478 and 479 preferably inclined peripherally and horizontally co-operating with those of the other blade to effect a plowing action on the clay. This plowing action is effected by so arranging the ridges and grooves of one blade in staggered relation with those of the other blade whereby ridges 480 (Fig. 30) formed on the clay by the grooves of one blade would be parted and/or shifted laterally by the ridges of the other blade. It is also contemplated that this plowing action could be a back and forth movement of the clay or could be a progressive movement either downward or upward as found best in each instance or condition and which may be determined by the arrangement of the ridges and grooves of the blades.

As the mold is initially, very slowly, lowered, the puddling arms contract away from the preformed charge, and as a result the depth to which the plowing action is effected on the clay gradually decreases until a fairly smooth surface is restored on the clay as the blades finally leave same. The inner ends of the active edges of the blades terminate at the point of intersection of the pivot axis of the blades and the axis of the spindle, whereby the puddling action will occur at said point as well and whereby the ridges at the outer portions of the blades will recede from the inner wall of the hollow ware shape without removing any of the clay.

For operating the puddling arms in timed relation with the raising and lowering of the molds, the piston rod 447 supporting the mold chuck reciprocates the spindle 463 during the upper portion of its stroke, by way of a lever 482 which oscillates through a push rod 483, a spring-pressed lever 484 in pivotal connection with the spindle.

On the spindle 463 is a stop collar 485 which engages the top of the sleeve 464 to limit downward movement of the spindle, and the sleeve is held in the bearing 465 by having nuts 486 threaded thereon and engaging the ends of the bearing whereby the sleeve is vertically adjustable to adjust the puddling device with respect to the molds when elevated. Accordingly, the push rod 483 may comprise two parts connected by a turnbuckle 487 so as to be adjustable for length in regulating the extent and timing of expansion and contraction of the puddling arms.

While the flat ware puddling devices 461 are designed to perform the same plowing action on the clay as the devices 460, the puddling arms 490 thereof with blades 491 contoured in accordance with the flat ware (see Figs. 29 and 33) may be fixedly secured on a base 492 having an upright stem 493 held in a bearing 494 of a bracket 495 on the table 442. However, it may have relatively movable plowing and trowelling blades as shown in my co-pending application, Serial No. 443,226. The brackets 495 and 466 may be duplicates, as shown, whereby each may support a flat ware or hollow ware puddling device to accommodate the various types of ware produced as well as various arrangements thereof on the conveyor.

The molds are next advanced to a machine 75 comprising a duplicate of the machine 60 adapted to spray water or dry air over the charges on certain zones thereof to put same in proper moist condition for further fabricating operations.

The molds are next carried to another press 76 which is a duplicate of the press 72 (Fig. 27) adapted to finally press the ware to the desired contour wall thickness and bond it to the mold suitable for jiggering. By so pressing the ware roughly to shape, then puddling same, and then again pressing it, all prior surface and deep strains and defects are eliminated and uniform consistency maintained.

Upon leaving the press 76, the clay ware shapes are again moistened by another conditioning machine 77, puddled again by another puddling machine 78, moistened again by another conditioning machine 79 until they arrive at a jiggering machine 80.

The purpose of the puddling machine 78 is to remove any minor, shallow strains that may be set up in the surface of the clay shapes by the press 76 and put the surface in optimum condition for jiggering, and accordingly may comprise a duplicate of the machine 74 with finer ridges and grooves formed in the puddling blades so that the plowing action on the clay thereby will be relatively shallow.

*Jiggering*

With the exception of tools, and other added parts, the jiggering machine 80 may comprise a slightly modified form of the structure of the press 72 with like parts having similar reference characters with an exponent "a." To this end (see Fig. 28), when the chucks 424a of the jigger are raised, the ware shapes are jiggered by jiggering tools 496 for hollow ware or jiggering tools 497 for flat ware while the molds are elevated and rotated by the chucks. The jiggering tools may be of any optimum type having beveled jiggering edges 498 and secured on the bottom ends of the piston rods 433a of the fluid motors 434a, with a trimming tool 499 carried on each jigger for trimming away excess clay spread beyond the edge of the ware forming surface of the molds. Said tools may be adjustably maintained in any desired angular position through dog 499a adjustably clamped onto the rods 433a and extended laterally into sliding engagement with a vertical guide rod 499b. For rotating the chucks 424a, the piston rods supporting same may extend through and be in splined connection with the hollow drive shafts 500 of electric motors 501 connected with the table 432a and energized from power lines through a suitable distributor switch 502 by way of conductors 503. As usual, the chucks are vacuumized to hold the molds fixed therein when raised, through passages in the piston rods 426a connecting with a vacuum line through a distributor 504 and flexible conduits 505.

This jiggering machine is characteristic of a similar one forming part of the subject matter of my co-pending application, Serial No. 413,734, and has for its purpose in this system to roughly jigger the ware to preliminary shape and remove the major portion of surplus clay from the clay surface, preparatory to the final jiggering.

The next machine 81 is another duplicate of the puddling machine 74 but designed to finally puddle the surface of the ware to a lesser depth than the puddler 78, after being roughly jiggered by the jigger 80, to eliminate any slight surface crevices, strains or other defects that may have been created by said clay removal and also plasticize the surface to facilitate subsequent polish jiggering.

The ware is then moistened or otherwise conditioned again by another duplicate 82 of the conditioning machine 60, and then jiggered to final form by a duplicate 83 of the jiggering machine 80. The main purpose of this machine is to be so lightly jigger the ware as to avoid ripping or straining the surface and produce an optimum polished surface thereon. To obtain the best results, relative rotation between the tools and ware of said machine may be the reverse of that on the machine 83, and wherein the beveled edges of the jigger tools would slope in the opposite direction to that of the tools of said machine, to thereby equalize any remaining drag strains set up by said first tool.

Upon leaving the final jiggering machine, the ware is advanced to another duplicate 84 of the conditioning machine 60 adapted to direct a blast of hot air or other conditioning medium over certain types of ware to be engobed, to put same in a suitable condition for the engobing operation to be performed thereon by the machine 85 to which the ware is next advanced.

Engobing the ware may consist in applying thereon a coating of compatible characteristic clay in a slip or semi-fluid or plastic state and which may be colored and/or of a higher grade of clay than the ware body, for the purpose of enhancing and/or increasing the quality or strength of the ware. For this purpose, the machine 85 may comprise another duplicate of the machine 69 with its nozzles adapted to spray the clay over predetermined zones or the entire ware surface with the supply lines 148, 149, 150 and 151 supplying the nozzles with the various types of clays required.

Continuing from the engobing machine 85, the clay coating applied to the ware may be dried or conditioned to a desired workable state by another adaptation 86 of the machine 60, then jiggered or smoothed to final shape by another adaptation 87 of the jiggering machine 80, and then further dried or conditioned by another conditioning machine adaptation 88 to be in proper condition for further decorating operations.

*Decorating*

Therefore, the next machine 89 to which the ware is advanced may be a duplicate of the machine 61 adapted to print or stamp directly on the interior wall of hollow ware or bottom side of flat ware, a decorative design, trade-mark or trade name of the producer or purchaser of the ware. For this purpose, the co-operating faces of the platens 176 and matrices 202 of this machine would be contoured in conformity with the surface of the ware to be decorated, and adjusted to operate accordingly, as shown in Fig. 15c, with the ware shown in dot-and-dash lines.

To provide for decorating the interior walls of hollow ware and the bottom sides of flat ware, with embossed ornamental clay formations, the next machine 90 comprises another adaptation of the machine 60 for conditioning all or a portion of the surface of the ware to the proper tacky condition for this operation which may be performed by the next machine 91.

For this purpose, the machine 91 constitutes another adaptation of the machine 61 with the platen 176 and matrix 202 contoured in conformity with the surface of the ware to be decorated, and adjusted to operate thereon accordingly, and whereby the molding recesses in the platens 176 would produce the embossed ornamental clay formations 506 on the ware, as seen in Fig. 15, applied to the bottom side of a piece of flat ware.

To provide for further enhancing, as by coloring these embossed ornamental formations, same may be first suitably dried or conditioned by the next machine 92, comprising another adaptation of the machine 60, and then have the enhancing performed by the next machine 93.

In this case, the machine 93 may constitute another duplicate of the machine 61 adapted, for example, to print the coloring matter on the embossed formations, and wherein the platen and matrix construction shown in Fig. 15a would be employed, with the inking and printing pads 241 and 240 contoured accordingly.

Drying

The dryer 95 is characteristic of a similar type forming part of the subject matter of my copending application, Serial No. 413,734, and comprises an elongated drying chamber 508 within which the mold conveyor is received through an entrance 509 near one end. In the chamber, the conveyor is supported on laterally spaced longitudinal inclined rails 509a and horizontal idler sprockets 510 on upright shafts 511 at the ends of the rails to travel in upwardly ascending and downwardly descending courses adjacent the sides of the chamber respectively.

At an intermediate portion of the path of the conveyor in the dryer, where certain ware to be appendaged has been suitably dried to leather hardness, the conveyor extends out of the dryer through openings 512 and into co-operative relation with the transfer machine 96 for transferring such ware to the appendaging machine 97, at the take-off station E.

Appendaging transfer

While the appendaging machine may have for its purpose the application of any form of appendages on certain ware, or diversified ware, in the present case its purpose is to cast handles on hollow ware shapes, particularly cups, while same are carried through the machine in an inverted position on conveying means.

Therefore, the transfer machine has been designed to invert the cup shapes as it transfers same from the mold conveyor to the conveying means of the appendaging machine, and to accommodate any number of cups that may be contained in each successive set of four molds on the mold conveyor. To this end, (see Figs. 34 to 37) the transfer machine includes a pedestal 514 supporting a stationary hollow central shaft 515 on which rotates a table 516 having in its periphery four equally spaced pockets 517 and grooves 518 therebetween to respectively support the mold carriers and cable sections of the mold conveyor as it travels therearound. On the table, central therewith, is an upright supporting drum 519 having vertical guideways 520, adjacent the pockets 517 and within each of which are reciprocably mounted upper and lower crossheads 521 and 522.

Each lower crosshead has a pair of outwardly extended arms 523 with bearings 524 rotatably supporting a horizontal shaft 525 having secured thereon a supporting head 526 disposed directly over a pocket and having a stem 526a upon which is detachably mounted a vacuum cup pick up chuck 527 (see Fig. 35c). Disposed above the supporting heads 526 are vacuum cup transfer chucks 528 carried on the bottom ends of upright stems 529 mounted for vertical adjustment in bearings 530 of outwardly extended arms 531 of the upper crossheads.

In that there is only one cup to be transferred from one of each set of four molds on the conveyor, as illustrated, only one transfer unit of the machine would be in operation while the rest are rendered inoperative.

As each cup mold is carried about the table (Fig. 36), the lower crosshead thereover is reciprocated below and above a starting position, and during the intermediate portion of its stroke above said position, its shaft 525 is oscillated 180 degrees, whereby the pick-up chuck will pick up the cup in the mold at the table station, A (Figs. 35-36) invert it, then place same in the transfer chuck thereabove at the table station B, and then lower to its starting position depending from said shaft at the table station C. As the empty cup mold leaves the table from its station C, the lower crosshead dwells at its starting position, the upper crosshead 521 is lowered, and the transfer chuck 528 caused to discharge the cup over a positioning form of the conveying means of the appendaging machine 97 at the table station C.

Each lower crosshead 522 is reciprocated by a fluid-pressure motor 532 supported on the table with the piston rod 533 thereof connected at its top end with a lug 534 on the head and having thereon adjustable stops 535 co-operating with end bearings of the motor cylinder to regulate the limits of movement of the head. Each fluid motor 532 is energized at the proper time from a fluid pressure line 536, by way of a distributor 537 on the central shaft, and a four-way valve 538 operated by arms 539 on said shaft and connected with the ends of the motor cylinder through conduits 540. When each lower crosshead is lowered by its motor from its uppermost limit, it is caused to dwell at its intermediate starting position by a stationary cam dwell segment 543 arranged on the central shaft and engaged by a roller 544 on the lug 534 of the crosshead.

During the intermediate portion of the stroke of each lower crosshead, its shaft 524 is oscillated to reverse the pick-up chuck 525, by an upright rack 545 (Figs. 35, 35a, 36) on the drum co-operating with a mutilated gear segment 546 on a shaft 547 carried by the crosshead and driving the former shaft through bevel gears 548. For holding the pick-up chuck in reversed positions during final upward and downward movements of the crosshead, at the ends of the rack 545 are guide bars 549 for co-operating with opposite sides of a square holding block 550 secured to the side of the gear segment 546.

Each pick-up head is vacuumized to pick up a cup, and then vented to release same when raised, by being connected to a vacuum line 553 and then opened to atmosphere through a distributing valve 554 on the central shaft, and a flexible conduit 555 leading therefrom and communicating with the chuck through constantly inter-connected passages 556, 557 and 557a formed in the crosshead, the supporting head 526 and stem 526a thereof respectively (see Fig. 35b).

The transfer chucks are raised to receive the cups at the table station A and then lowered to discharge same at the station B, by means of fluid motors 560 arranged on the supporting drum 519 with their piston rods 561 connected at their bottom ends with lugs 562 on the upper crossheads 521. On the piston rods 561 are adjustable stops 563 for engagement with the ends of the motor cylinders to regulate the limits of movement of the transfer chucks. The fluid motors 560 are energized at the proper time by being connected with the pressure line 536 through a distributor 564 and four-way valves 565. The transfer chucks are alternately vacuumized and vented to hold the cups and release same, by being connected with the vacuum line 553 and then opened to atmosphere through a distributor valve 566 and flexible conduits 567 connecting with central passages in the stems 529 of the chucks.

Associated with each pick-up chuck 527 is a device 527a which, as a cup is picked up by the chuck, smoothes or rounds off the upper edge of the cup (see Fig. 35c). This device may comprise a wheel rotatably mounted on the stem 526a carrying the chuck and having a concentric rounded groove 527b in its under surface co-operating with a burnishing tool 527c detachably mounted on the wheel and interposed in said groove to round the edge of the cup as the wheel is rotated. The wheel may be yieldably held on the stem 526a in longitudinally adjusted operating position by means of a hollow adjusting screw 527e threaded in a bearing 527f of the supporting head and resiliently connected with the wheel through a bolt 527g extending therethrough having a yoke and groove connection 527h with the hub of the wheel, and a coiled spring 527i held under compression on the bolt between the screw and the yoke connection by a nut 527j for regulating the amount of compression of the spring.

The wheel 527a may be rotated as the chuck 527 is picking up a cup and for an optimum period thereafter, by an electric motor 527k carried on the support head 526 and driving the wheel through a pulley and belt drive connection, or by having a friction drive pulley 527m on its shaft in driving engagement with the edge of the wheel. Each of the motors may be energized at the proper time from suitable power lines, by way of a drum type distributor 527n on each supporting head 526 and a suitable combination distributor and switch 527o on the central shaft, as seen in Figs. 34 and 35b.

*Appendaging*

The appendaging machine is somewhat characteristic of the casting machine forming the subject matter of my co-pending application, Serial No. 392,276, filed May 7, 1941. Said machine includes an elongated frame 570 having a pedestal 571 at one end supporting a rotating upright shaft 572 on which is a drive sprocket 573 supporting one end of an endless sprocket chain conveyor 574 whose other end is supported on an idler sprocket 575 at the other end of the frame. (See Figs. 3, 34 and 36).

On the conveyor chain 574 are a series of equally spaced apart carriers 576 having side rollers 577 travelling on rails 578 to support and position the carriers as they travel with the chain. On each carrier is a two-part handle slip casting mold 579 and a positioning form 580 to position a cup in co-operative relation with the casting mold in casting a handle on the cup, with each mold having a well and sprue 581 to receive the clay in slip form.

The conveyor chain 574 is intermittently driven and arranged that upon each movement thereof, a carrier is caused to travel about the axis of the transfer machine 96 in register below a transfer chuck 528, whereby a cup discharged from the chuck will be deposited on the positioning form 580 of the carrier at the station D of said machine. The carriers are caused to travel about the axis of the transfer machine by the conveyor 574 being accordingly deflected in its path along an arcuate guide member 584 and about idlers 585 at the ends thereof.

After receiving a cup, each carrier then continues about the drive sprocket 573 where one of a number of feeder heads 586 carried on the shaft 572 is lowered over the sprue of the mold and charges same with slip clay. The feeder head 586 is then raised off the mold as the carrier leaves the sprocket and continues through a tunnel 587 with controlled atmosphere, where the handle casting in the mold is suitably hardened and united with the cup.

As the carriers 576 return from the tunnel to the station D of the transfer machine, the molds are temporarily automatically opened at a take-off station T (Fig. 3), to permit the removal of the handled cups therefrom, and then continue in open position through a tunnel 587a within which the molding surfaces of the molds are conditioned before being closed preparatory to another cycle of operation.

Each feeder head 586 comprises an upright pipe loosely received in a bearing 588 of a bracket 589 on the shaft 572, and being pivoted to a lever 590 co-operating with a stationary cam 591 to raise the pipe and control lowering speed of same onto a casting mold. At the top end of the pipe is a bearing 594 supporting a valve rod 595 which, after the pipe is lowered, opens a poppet valve 596 at the bottom end of the pipe to permit discharge of the clay slip therefrom. Upon final downward movement of the pipe, the valve rod is stopped from movement therewith to open the valve, by a lever 597 pivotally connected with the rod and co-operating with a stationary cam 598.

On the top end of the shaft 572 is a central supply tank 599 from which the clay slip is supplied to the pipes 586 by way of flexible conduits 600.

The top of the tank is covered by a stationary cover plate 601 from which continues a conduit 602 opening into the tank and communicating with the clay supply lines 68 of the clay preparation system R by way of valved branches 603 thereof (Fig. 2) and a header 604, whereby the tank may be selectively supplied from any one of the headers 38 of said system, with the desired type of clay slip suitable for the casting of the handles. The clay slip may be maintained at a constant level in the tank by means of a float 605 controlling the opening and closing of a poppet valve 606 in the outlet of the conduit 602 through a lever and link connection 607, as seen in Fig. 34.

For driving the appendaging machine in timed relation with the transfer machine, mounted on the hub 610 of the transfer table 516 is a sprocket wheel 611 driving through a sprocket chain 612, a similar sized sprocket 613 on the hub of a wheel 614 mounted on an upright shaft 615 supported on the base of the pedestal 571. For each transfer unit that is functioning, there is provided for attachment to said wheel in like order, by bolts 616, a gear segment 617 (Figs. 36 and 37) for intermittently meshing with a gear 618 secured on the shaft 572 of the appendaging machine, whereby upon one complete rotation of the table, the conveyor will be so intermittently advanced as to cause the carriers thereon to successively receive ware from that number of transfer units that may be functioning.

For each transfer unit that is not functioning, there is provided for attachment to said wheel in like order, by bolts 619, a concentric cam dwell segment 620 for co-operating within correlatively formed pockets 621 in the periphery of a star wheel 622 attached to the side of the gear 618 for holding the conveyor 574 stationary between movements thereof.

As shown, the carriers 576 are spaced at intervals on the conveyor chain 574 less than the distance between the transfer units about the axis of the transfer table so that a maximum number of the carriers may be employed. To compensate for this difference, while at the same time permitting successive carriers to travel in unison with the transfer units, on the wheel 614 are secured at equally spaced intervals thereabout four permanent cam dwell segments 623 between which the detachable cam dwell segments 620 form extensions thereof.

As a rule, large, thick-walled flat ware pieces will require a longer drying time than the smaller thin-walled pieces, and deep, thick-walled hollow ware requires the longest drying time.

Therefore, as the mold conveyor continues through the dryer, small flat ware pieces as saucers, may be removed at the next take-off station F by the machine 98, the plates removed at the next station G by the machine 99, and finally the bowls removed by the machine 103.

For this purpose, each transfer machine 98 and 99 may comprise a duplicate of the machine 96 with its transfer and pick-up chucks contoured or adapted to accommodate the saucers or plates to be transferred thereby, as seen in Fig. 36a, or said machines may comprise duplicates of the transfer machine 103 hereinafter described.

The conveyors 100 and 101 may be of the endless belt type arranged to receive the saucer and plate pieces from the transfer chucks of the machine 98 and 99 and then carry them to suitable locations to be fettled, sponged, further decorated and glazed preparatory to being fired.

The mold conveyor is deflected out of its course in the dryer through openings 626 in the dryer wall to travel about the tables of the transfer machines 98 and 99, by means of idler sheaves 627.

The reforming machine 102 to which the molds are next advanced after leaving the dryer may be another duplicate of the press 72 (Fig. 27) so that any ware still in a workable condition that has become distorted or warped during drying may be reformed on the mold before being removed from the conveyor by the machine 103.

While the transfer machine 103 may be another adaptation of the machine 96, it is designed to so co-operate with the conveyor system 103a, whereby any one or all of the various ware pieces may be removed from the mold conveyor at this last station, and transported in upright or inverted position to one or a number of different locations in the pottery for further finishing operations preparatory to firing.

Referring to Figs. 38 to 41, this machine includes a base or pedestal 630 supporting an upright hollow shaft 631 on which rotates a table 632 having in its periphery four equally spaced pockets 633 and grooves 634 therebetween to respectively support the mold carriers and cable sections of the mold conveyor. On the table, central therewith, is a supporting drum 635 having adjacent each table pocket, a vertical guideway 636 within which is reciprocably mounted upper and lower crossheads 637 and 638.

Each lower crosshead has a bearing 639 extending therethrough rotatably supporting a horizontal shaft 640 on whose outer end is secured a supporting head 641. On the head 641 is an offset angular bearing 642 supporting the trunnion 643 of a turret 644. Mounted on the turret to extend angularly therefrom about the axis thereof, in cluster-like arrangement, are four stems 645 supporting at their ends, respectively, vacuum pick-up chucks 646, 647, 648 and 649 for the cup, saucer, plate and bowl pieces and which are arranged to be brought into operating position above the adjacent table pocket upon adjustment of the turret 644 on the head 641. For holding the turret in adjusted positions, same may have a series of notches 650 adapted to be engaged by a spring-pressed detent 651 on the bearing 642 (Fig. 38a).

Each upper crosshead has an outwardly extended bracket 655 having an angular bearing 656 supporting the trunnion 657 of a turret 658. Radiating from the turret, like the stems 645 are stems 659 at the ends of which are transfer chucks 660, 661, 662 and 663, formed to receive the ware pieces from the chucks 646 to 649 respectively, and which are brought into operating position, for this purpose, in co-axial alignment with the table pocket therebelow, by adjustment of the turret 568. This turret may be held in adjusted position by means similar to that employed for the turret 644.

By means of an idler sheave 66, (Fig. 1) the mold conveyor is guided to mesh with the table 632 within a very short arch about its axis, as at the station I (Fig. 39), and as the molds are received in the table pockets 633, the pick-up chuck thereabove is caused to pick up the ware from the mold, as the chuck is lowered and raised by its respective lower crosshead. As the chuck continues with the table, and assuming that the ware is not to be inverted when transferred, the chuck may be again lowered and raised through the table pocket at any one of four successive stations J, K, L, or M, of the table, and caused to discharge the ware onto any one of a lower series of four conveyors 667 arranged below the table tangentially about the axis thereof and adapted to convey the various types of ware to different locations for further treatment. These conveyors may be of the endless belt type mounted on a frame-work 668 and so driven in timed relation with the table, by suitable means, whereby the ware discharged thereon will travel momentarily with the pick-up chucks until they clear same. Thus, the ware so transferred would assume the same position on the conveyors 667 as they assumed on or in the molds, with hollow ware in upright position, and flat ware in inverted position.

The conveyors 667 may be of the endless chain type, if desired, provided with ware supports and so driven in synchronism with the transfer machine to cause the ware to be discharged onto the supports.

If it is desired to reverse the position of the ware when transferred, each lower crosshead would be caused to continue upward after being initially lowered and raised at the station I, whereupon the support head 641 carried thereby would be rotated 180 degrees to reverse the position of the effective pick-up chuck thereon and then continue upward with the cross-head to its upper limit where the reversed ware carried by the chuck is picked up by the transfer chuck thereabove.

As the transfer chuck then continues around with the table, it may be lowered and raised, through reciprocation of its upper crosshead, at any one of the table stations J, K, L or M, and caused to discharge the ware onto any one of an upper series of four conveyors 669 similar to the conveyors 667 and arranged thereabove on the frame-work 668, whereby the ware would be conveyed thereon to the same location for further treatment, to which the lower conveyors are directed but in a reversed position.

The upper crossheads 637 are reciprocated by cylinder and piston fluid-pressure motors 672 carried on the drum 635 with adjustable stops 673 on their piston rods 674 adapted to engage end bearings of the cylinders to control the limits of movement of the crossheads. Each motor 672 is energized from a main fluid-pressure line 675 by way of a distributor 676, a flexible conduit 677 leading therefrom, a four-way valve 678 and flexible conduits 679. The valve 678 for each motor is of the oscillated type provided with a spring-pressed operating lever 680 (Fig. 39) and secured to the upper end portion of an upright pipe 683 adjustable in bearings 684 and 685 of the drum and table to bring the valve lever into co-operative relation with either one of a set of four stationary cams 686 mounted on the central shaft 631 to respectively actuate the valve in causing reciprocation of the crosshead of its unit at the various table stations J, K, L or M.

The lower crossheads 638 are reciprocated by cylinder and piston fluid-pressure motors 693 carried by the table 632 with their piston rods 694 extending upward into connection with the crossheads. When a lower crosshead is operated to transfer ware to one of the upper conveyors 669 upon leaving the table station I, it is held in an intermediate starting position between the limits of its stroke by its respective piston rod having an arm 695 provided at its end with a roller 696 adapted to ride upon the edge of a stationary disc 697 on the central shaft, as seen at the left end of Fig. 38. When the crosshead is lowered at the station I, to pick up the ware, the roller 696 passes through an arcuate notch 698 in the edge of the disc 697 and momentarily rides upon the edge of a disc-segment 699 to limit downward movement of the crosshead. As the crosshead continues upward to transfer the ware to its associated transfer chuck, the roller again passes through said slot and the crosshead is stopped at its uppermost limit by engaging an adjustable stop 700 on the inner side of the drum. On the return stroke of the crosshead, it is again stopped at its intermediate starting position by the roller engaging the disc 697, as may be more clearly understood by referring to Fig. 42 which comprises a developed view of the edges of the disc and disc segment with the path of the roller being indicated by the heavy dot-and-dash line N.

Each lower crosshead is confined to a lower zone of action when transferring ware to either one of the lower set of four conveyors 667 by being so reciprocated that its upward movement is limited by the roller 696 thereof engaging the under side of the disc 697, and its downward movement at any one of the table stations J, K, L or M is limited by the roller engaging an adjustable stop 701 carried by the table. To accomplish this, the timing of the lowering and raising of the crosshead at the table station I is advanced and retarded respectively to prevent the roller from passing upward through the arcuate notch 698 in the disc 697, as seen in Fig. 42, with the path of the roller being indicated by the light dot-and-dash line O.

The fluid motors 693 are energized from the main pressure line 675 by elements like those employed for the motors 672 and including a distributor 704 and four-way valves 705 arranged on the pipes 683 for adjustment therewith into cooperative relation with either one of four cams 706 arranged on the central shaft to respectively actuate the valves in causing reciprocation of the lower crossheads of their units at the station I and either one of the stations J, K, L or M, when transferring ware to the lower conveyors 667.

When the lower valve 705 of a transfer unit is positioned to be operated by one of the cams 706, the lever of its associated upper valve 678 is above the plane of the set of cams 686 and maintained in position to hold the upper crossheads elevated while the unit is transferring ware to one of the lower conveyors 667. When said upper valve of the unit is set to be operated by one of the cams 686, in transferring ware to one of the upper conveyors 669, the lower valve 705 is positioned to be operated by a cam 707 to cause reciprocation of the lower crosshead only at the table station I in transferring the ware from the main mold conveyor to the transfer chuck of the unit.

To enable the employment of a liquid pressure medium for the fluid motors, if desired, the exhaust ports of the valves 678 and 705 may be in constant communication with a waste line 708 by way of the pipes 683 and flexible conduits 709 cooperating between same and a distributor 710 on the central shaft 631.

The active transfer and pick-up chucks of each machine unit are vacuumized during the different periods required to transfer the cups to the various table stations J, K, L or M by same being connected to a vacuum line 714 by way of a distributor 714a common to both, and three way valves 715 and 716 for the chucks respectively, mounted on the pipe 683 of the unit. The valve 715 is operated in accordance with the adjustment of its associated valve 678 by either one of a series of four cams 715a on the central shaft. The valve 716 is operated in accordance with the adjustment of its associated valve 705 by either one of a series of four cams 716a, when the unit is transferring ware to the lower conveyors, or operated by a cam 716b when transferring ware to the upper conveyors.

The pipes 683 may be held in vertically adjusted positions by indexing means comprising a series of notches 683a arranged along the side thereof and adapted to be engaged by a set screw 683b in the bearing 685 supporting the pipe (see Fig. 38).

When a pick-up chuck is in operating position on its turret, the service port of the valve 716 of the unit connects therewith through a flexible conduit 717, interconnected passages 718 and 719 in the crosshead 638 and support head 642 carried thereby and a passage 720 in the turrent arranged to be brought into register with the passage 719 when the turret is rotated to bring the chuck into operating position. The passages 718 and 719 are maintained interconnected during rotation of the support head 642 on the crosshead by way of an annular passage 721 formed between the contacting bearing faces of the heads.

The transfer chucks 662 may be likewise connected with their respective valves 715, with the exception that the passage in each crosshead 637 would register directly with any one of the passages in the turret 658 carried thereby.

Each supporting head 641 is rotated 180 degrees during the intermediate portion of the upper range of movement of its respective crosshead 638, by its shaft 640 having a segmental gear 640a arranged to cooperate with a stationary vertical rack 640b on the inner side of the drum 635. To hold the pick-up chucks in alignment with the molds and transfer chucks during the end portions of the range of movement thereof with their crossheads, on the side of each gear 640a is provided a square holding block 640c arranged to engage spaced guide portions 640d along the edge of a vertical guide bar 640e on the side of the rack 640b.

In view of the many advantages attained by this transfer machine in transferring the various types of ware to any one or a number of treatment stations in inverted or upright position, in some installations of the system it may be desirable to employ similar machines at the take-off station F and G instead of adaptations of the transfer machine 96.

The machines 104 and 105 may comprise adaptations of the machine 103 and the conveyor systems 104a and 105a associated therewith may constitute adaptations of two or more of the lower sets of conveyors 667 provided with mold carriers or supports 105b, (Fig. 1) as it is preferred to transfer the molds from and to the main mold conveyor in an upright position only. In that machine 105 is adapted to transfer the molds from the conveyor system 105a to the main mold conveyor, the timing of the vacuumizing and venting of the pick-up chucks would be the reverse of that for the chucks of the machine 104.

The machines 106 and 107 may constitute duplicates of the conditioning machine 60, supplied, respectively, with air, or any dry gaseous cleaning medium and oil under pressure to pneumatically clean the molds and then oil same.

While any number of the machines may be in driven connection with the power shaft 109a, the shaft is illustrated as driving the machines 73, 81, 83 and 93 through the gearing 109b which may include worm gears 109c on said shaft meshing with worm gear formations 109d on the edges of the wheels 124, 451, 432a and 175e of said machines respectively, as seen in Figs. 4, 29, 28 and 7.

If desired, a silk screen decorating machine may be included in the system to decorate the cups after being dried, and to which machine the cups may be temporarily transferred from the transfer machine 96 by interposing another transfer machine of a similar nature.

For rendering inoperative any one of the various rotary machines having fluid pressure and vacuum-operated means, a shut-off valve 725 may be interposed in each of the pressure and vacuum lines supplying same. While this applies to the decorating machine 61 and duplicates thereof, if desired the mold chucks of same may be rendered inoperative by disconnecting the shafts 175b from the levers 175f, so that the molds may remain on the conveyor as they pass around the machine.

Having thus described my invention, what I claim is:

1. In apparatus for making pottery dinnerware and the like, the combination with a pottery dryer of a plurality of rotary machines having continuously moving clay feeding, ware fabricating, mold and ware conditioning, ware decorating and mold and ware transferring members respectively, a continuously moving mold conveyor connected to all of said machines for operation therewith, means for driving the conveyor and machines in unison and means for actuating the members of each machine whilst in motion.

2. In apparatus for making pottery dinnerware and the like, the combination with a pottery dryer of a plurality of rotary machines having continuously moving clay feeding, ware forming, ware and mold conditioning, ware decorating and mold and ware transferring members respectively, a continuously moving mold conveyor connected to all of said machines for operation therewith, means for driving the conveyor and machines in unison, means for actuating the members of each machine whilst in motion, and means for selectively interrupting the operation of any of said members.

3. In apparatus for making pottery dinnerware and the like, the combination with a pottery dryer of a plurality of rotary machines having continuously moving clay feeding, ware fabricating, mold and ware conditioning, ware decorating and mold and ware transferring members respectively, a continuously moving mold conveyor connected to all of said machines for operation therewith, means for driving the conveyor and machines in unison, means for actuating said members whilst in motion, and means for varying the functions and the functioning of said members thereby to alter the production.

4. In apparatus for making pottery dinnerware and the like, the combination with a pottery dryer of a plurality of rotary machines having continuously moving clay feeding, ware fabricating, mold and ware conditioning, ware decorating and mold and ware transferring members respectively, a continuously moving mold conveyor connected to all of said machines for operation therewith, means for driving the conveyor and machines in unison, means for actuating said members whilst in motion and means for varying the functions and the functioning of said members thereby to alter the production, some of said last named means being operable whilst the members are in motion.

5. In apparatus for making pottery dinnerware and the like, the combination with a pottery dryer of a plurality of rotary machines having continuously moving clay feeding, ware fabricating, mold and ware conditioning, ware decorating and mold and ware transferring members respectively, a continuously moving mold conveyor connected to all of said machines for operation therewith, means for driving the conveyor and machines in unison, means for actuating said members whilst in motion, means for varying the functions and functioning of said members thereby to alter the production, some of said last named means being operable whilst the members are in motion and means for selectively interrupting the operation of some of said members.

6. The combination with a pottery dryer of an endless continuously moving mold conveyor traversing said dryer, a plurality of rotating machines connected to said conveyor to be driven therewith having devices which rotate continuously about the axes of said machines for feeding clay to molds, fabricating ware, conditioning ware and molds, decorating ware and transferring ware and mold respectively and automatically operated means for actuating said devices whilst continuously rotating about the axis of the machine with which a given device or devices is or are associated.

7. The combination with a pottery dryer of an endless, continuously moving mold conveyor traversing said dryer, a plurality of rotating machines connected to said conveyor to be driven therewith, devices associated with said machines for feeding clay to molds, fabricating ware, conditioning ware and molds, decorating ware and transferring ware and molds, a common drive for continuously moving said conveyor and for rotating said devices continuously about the axis of the machine with which a given device or devices is or are associated and regulable means for actuating said devices whilst in continuous motion about the axes of said machines.

8. The combination with a pottery dryer of an endless, continuously moving pottery mold transporting conveyor traversing said dryer, a plurality of rotary table machines connected to said conveyor to be driven therewith, the tables of said machines rotating continuously with and relative to the conveyor, devices movable with the rotary tables for feeding clay, fabricating ware, conditioning molds and ware, decorating ware and transferring ware and molds and means operable whilst the tables are in motion for actuating said devices.

9. The combination with a pottery dryer of an endless continuously moving mold conveyor traversing said dryer, a plurality of machines connected to said conveyor to be driven therewith having devices operable in repeated cycles and in continuous motion relative to the conveyor for feeding clay, fabricating ware, conditioning molds and ware and decorating ware, ware appendaging apparatus adjacent said conveyor, ware transfer mechanism for transferring a portion of the production from the mold conveyor to the appendaging apparatus in order to complete the formation of appendaged ware, a plurality of ware transfer mechanisms adjacent the conveyor and disposed at other points therealong for removing other ware from the mold conveyor and means for synchronizing the operation of the transfer mechanisms with the mold conveyor.

10. The combination with a pottery dryer of a continuously moving, endless mold conveyor, continuously moving devices for fabricating pottery ware connected to said conveyor be driven therewith and arranged to operate in repeated cycles including means for feeding, forming and decorating clay, a source of supply of materials in closed controlled association with said feeding and decorating means, ware transferring mechanism also operable in repeated cycles for removing ware from said conveyor, mold transferring mechanism also operable in repeated cycles for changing molds on said conveyor and slip casting apparatus adjacent said conveyor for receiving at least some of the ware produced by the forming machinery and completing the formation thereof while automatically producing and attaching appendages thereto.

11. The combination with an endless, continuously moving mold conveyor for transporting pottery molds to clay fabricating and ware decorating zones of continuously moving apparatus connected to said conveyor to be driven therewith for feeding clay to, fabricating and decorating ware on and removing ware from the conveyor whilst the conveyor and apparatus is in motion.

12. The combination with an endless, continuously moving mold conveyor for transporting pottery molds to fabricating and decorating zones of continuously moving apparatus connected to said conveyor to be driven therewith including clay feeding means, ware jiggering means and ware decorating means said means being operable whilst the conveyor and apparatus is in motion.

13. The combination with an endless, continuously moving mold conveyor for transporting pottery molds to a clay fabricating zone of continuously moving apparatus connected to said conveyor to be driven therewith arranged to fabricate ware on said molds whilst the conveyor and apparatus is in motion and automatically operated apparatus mounted to move with the conveyor for removing ware from said conveyor whilst the conveyor and apparatus is in motion.

14. The combination with an endless continuously moving mold conveyor for transporting pottery molds to a clay fabricating zone of continuously moving apparatus connected to said conveyor to be driven therewith arranged to fabricate ware on said molds and apparatus movable continuously with relation to the mold conveyor for changing the molds on said conveyor whilst the conveyor and apparatus is in motion.

15. The combination with an endless continuously moving mold conveyor for transporting pottery molds to a clay feeding, fabricating and decorating zone of continuously moving apparatus connected to said conveyor to be driven therewith arranged to feed charges of clay to the molds whilst the conveyor and feeding apparatus is in motion, apparatus movable with the conveyor, arranged to fabricate ware on the molds whilst the conveyor and fabricating apparatus is in motion and apparatus movable with the mold conveyor arranged to charge the molds on said conveyor whilst the conveyor and mold changing apparatus is in motion.

16. The combination with an endless, continuously moving mold conveyor for transporting pottery molds to clay fabricating and decorating zones of continuously moving apparatus connected to said conveyor to be driven therewith arranged to jigger pottery ware on said molds whilst the conveyor and apparatus is in motion and apparatus movable with said mold conveyor arranged to apply surface decorations to the surface of the ware whilst the conveyor and apparatus is in motion.

17. The combination with an endless, continuous motion, mold conveying means that transports pottery molds over a ware production line, of a plurality of continuous motion machines for fabricating ware on said molds connected to said conveying means to be driven therewith and forming together therewith a continuously moving production line and automatic machinery interposed in said line and operatively associated with said conveying means, having means for applying to the surface of molds or ware various mediums, in the form of fluids or solids common to the manufacture of this class of ware mounted to move with said conveying means and means for causing the applying means to function whilst they and the conveying means are in motion.

18. The combination with an endless continuous motion mold conveying means that transports pottery molds over a ware production line, a plurality of automatically operable continuous motion machines for fabricating ware on said molds connected to said conveying means to be driven therewith and defining the production line, and automatically operable mold conditioning machinery associated with said conveying means, provided with means for applying conditioning medium to the molds having continuous motion therewith, a source of supply of conditioning medium and means, operable whilst the conditioning machinery is in motion, for causing said applying means to function and condition a mold disposed therebelow.

19. The combination with a mold conveyor having continuous motion of apparatus connected to said conveyor to be continuously driven therewith for feeding, pressing and puddling clay and applying various conditioning mediums thereto, and automatically operated means for actuating said apparatus whilst said apparatus and said conveyor are in motion.

20. The combination with a mold conveyor having continuous motion of apparatus connected to said conveyor to be continuously driven therewith for feeding clay to the molds, puddling the top and bottom surfaces of the clay applied to the mold and pressing the clay on the mold together with automatically operated means for actuating said apparatus whilst said apparatus and said conveyor are in motion.

21. The combination with a mold conveyor having continuous motion of means for feeding clay to molds connected to said conveyor to be continuously moved therewith, a plurality of pressing means for imparting a preliminary and final pressing to the clay deposited on the molds, a plurality of puddling means for imparting a preliminary and a final puddling to the clay deposited on the molds and means for conditioning the clay between operations aforesaid, all of said means being mounted to move with said conveyor and to perform their respective operations whilst travelling with the molds and automatically operated means for actuating all of said means whilst travelling with the conveyor and molds.

22. The combination with a mold conveyor having continuous motion of apparatus operably connected to said conveyor to be continuously driven therewith for feeding, pressing, puddling and jiggering clay and means for actuating said apparatus whilst said apparatus and said conveyor are in motion.

23. The combination with a mold conveyor having continuous motion for transporting pottery molds to pressing, puddling and jiggering zones of apparatus connected to said conveyor to be continuously driven therewith for pressing, puddling and jiggering clay on said travelling molds, said apparatus being mounted to move with said conveyor and having automatically operated actuating means.

24. The combination with a mold conveyor having continuous motion of continuously moving apparatus connected to said conveyor to be continuously driven and moved therewith for feeding, puddling and jiggering clay and means for actuating said apparatus whilst moving with said conveyor.

25. The combination with a continuously moving mold conveyor of apparatus for forming pottery ware connected to said conveyor to be driven therewith and having automatically operated means for actuating said apparatus together with a reforming machine having devices for reforming ware mounted to move with the conveyor and having means for actuating said devices.

26. The combination with a mold conveyor having continuous motion of angularly movable apparatus connected to said conveyor to be continuously driven therewith, for fabricating pottery ware and ware transferring apparatus having transfer devices also mounted to move with the conveyor for removing ware therefrom whilst the conveyor is in motion having means for actuating the transfer devices together with apparatus for performing further fabricating operations on the ware thus removed from the conveyor.

27. The combination with a continuously moving mold conveyor of continuously moving apparatus for fabricating pottery ware, connected to said conveyor to be continuously driven therewith, and apparatus for removing formed ware from the conveyor having devices for picking up and inverting the ware removed from the conveyor.

28. The combination with a continuously moving mold conveyor of apparatus for forming ware on said molds whilst the molds are travelling with the conveyor that is connected to the conveyor to be driven therewith, and apparatus for removing dried ware from the molds and finishing the said ware, said last-named apparatus having ware pick-up and finishing devices mounted to move with the conveyor and to perform the operations specified whilst the ware is travelling.

29. The combination with a continuously moving ware conveyor of apparatus connected to said conveyor to be continuously driven therewith for forming ware and apparatus for removing ware from the conveyor and trimming and smoothing the ware having devices for removing the ware from the conveyor and trimming and smoothing the same mounted to move with the conveyor and to perform the specified operations whilst the ware is in continuous motion toward a point of removal from the apparatus.

30. Apparatus for manufacturing dinnerware and the like comprising continuously moving supports for carrying molds in fabricating zones, means movable therewith at one of the zones for forming ware on the molds, means movable therewith at another of the zones for finishing the ware and means movable therewith at another of the zones for removing ware from the molds, and a continuously traveling mold conveyor movable with the supports at the various zones for delivering molds thereto and removing molds therefrom.

31. Apparatus for manufacturing dinnerware and the like comprising continuously moving supports for carrying molds in fabricating zones, means movable therewith at one of the zones for forming ware on the molds, means movable therewith at another of the zones for finishing the ware, means movable therewith at another zone for decorating the ware and a continuously traveling mold conveyor movable with the supports at the various zones for delivering molds thereto and removing molds therefrom.

32. Apparatus for manufacturing dinnerware and the like comprising continuously moving supports for carrying molds in fabricating zones, means for cleaning the molds and conditioning them for ware fabrication, means for feeding clay to the molds, means movable with said supports at one of said zones for forming ware on the molds, means movable with said supports at another of the zones for finishing the ware, a continuously traveling mold conveyor movable with the supports at various zones for delivering molds thereto and removing molds therefrom and means for removing formed ware from said molds.

33. Apparatus for manufacturing dinnerware and the like comprising continuously moving supports for carrying molds in fabricating and other zones, means movable therewith in one of said other zones for cleaning the molds, means movable therewith at one of the fabricating zones for forming ware on said molds, means movable therewith in another fabricating zone for finishing the ware, a continuously traveling mold conveyor movable with the supports at the fabricating and other zones for transporting molds thereto and removing molds therefrom, and means for removing formed ware from said molds at one of said other zones.

34. Apparatus for manufacturing dinnerware and the like comprising continuously moving supports for carrying molds in fabricating and other zones, means movable therewith in one of said other zones for cleaning the molds, means movable therewith at one of the fabricating zones for forming ware on said molds, means movable therewith in another fabricating zone for finishing the ware, a continuously traveling mold conveyor movable with the supports at the fabricating and other zones for transporting molds thereto and removing molds therefrom, and angularly movable means, movable therewith for removing formed ware from said molds at one of said other zones.

35. Apparatus for manufacturing dinnerware and the like comprising, a plurality of rotary machines for forming and finishing pottery ware respectively, a continuously moving mold conveyor connected to said machines for driving all of them in unison as well as carrying molds and/or ware thereto and removing molds and/or ware therefrom and means for continuously driving said conveyor.

36. Apparatus for manufacturing dinnerware and the like comprising, a dryer, a plurality of rotary machines for forming and finishing pottery ware respectively, a continuously moving mold conveyor connected to said machine for driving all of them in unison arranged to carry molds with ware thereon through the dryer and means for continuously driving said conveyor.

37. Apparatus for manufacturing dinnerware and the like comprising, a dryer, a plurality of rotary machines for forming ware, removing the ware from the conveyor and finishing the same respectively, a continuously moving mold conveyor connected to said machines for driving all of them in unison and arranged to carry molds with ware thereon through the dryer and means for continuously driving said conveyor.

38. Apparatus for manufacturing dinnerware and the like comprising, a dryer, a plurality of rotary machines for feeding clay to molds, forming ware, conditioning molds and ware, decorating ware, transferring ware, finishing ware, and transferring molds respectively, a mold conveyor connected to all of said machines for driving all of them continuously and arranged to transport molds through the dryer and means for continuously driving said conveyor.

39. Apparatus for making dinnerware and the like comprising, a dryer, a continuously moving mold conveyor arranged to carry molds through the dryer, a rotary machine for fabricating potteryware, a rotary machine for removing dried ware from molds, said machines being connected to said conveyor to be continuously driven therewith and means for driving said conveyor.

40. Apparatus for making dinnerware and the like comprising, a dryer, a continuously moving mold conveyor arranged to carry molds through the dryer, a rotary machine for fabricating pottery ware, a rotary machine for decorating dried potteryware, said machines being connected to said conveyor to be continuously driven therewith, and means for driving said conveyor.

41. Apparatus for making dinnerware and the like comprising, a continuously moving mold conveyor having mold carriers attached thereto, a track over which said mold carriers are moved, a rotary ware fabricating machine adjacent said track, a rotary ware finishing machine adjacent said track, said machines being connected to said conveyor to be continuously driven therewith and means for driving said conveyor.

42. Apparatus for making dinnerware and the like comprising, a continuously moving mold conveyor having mold carriers attached thereto, a track over which said mold carriers are moved, a rotary ware fabricating machine adjacent said track, a rotary ware transferring machine adjacent said track, said machines being connected to said conveyor to be continuously driven therewith and means for driving said conveyor.

43. Apparatus for making dinnerware and the like comprising, a continuously moving mold conveyor having mold carriers attached thereto, a track over which said mold carriers are moved, a rotary ware fabricating machine adjacent said track, a rotary ware decorating machine adjacent said track, said machines being connected to said conveyor to be continuously driven therewith and means for driving said conveyor.

44. Apparatus for making dinnerware and the like comprising, a continuously moving mold conveyor having mold carriers attached thereto, a track over which said mold carriers are moved, a rotary ware fabricating machine adjacent said track, a rotary ware mold transferring machine adjacent said track, said machines being connected to said conveyor to be continuously driven therewith and means for driving said conveyor.

45. Apparatus for making dinnerware and the like comprising, a continuously moving mold conveyor having mold carriers attached thereto, a track over which said mold carriers are moved, a rotary ware fabricating machine adjacent said track, a rotary ware mold conditioning machine adjacent said track, said machines being connected to said conveyor to be continuously driven therewith and means for driving said conveyor.

46. Apparatus for making dinnerware and the like comprising, a continuously moving mold conveyor having mold carriers attached thereto, a track over which said mold carriers are moved, a rotary wire fabricating machine adjacent said track, a rotary ware clay feeding machine adjacent said track, said machines being connected to said conveyor to be continuously driven therewith and means for driving said conveyor.

47. Apparatus for making dinnerware and the like comprising, a continuously moving mold conveyor having mold carriers attached thereto, a track over which said mold carriers are moved, a rotary ware fabricating machine adjacent said track, a rotary ware engobing machine adjacent said track, said machines being connected to said conveyor to be continuously driven therewith and means for driving said conveyor.

WILLIAM J. MILLER.